(12) United States Patent
Joel et al.

(10) Patent No.: US 9,342,620 B2
(45) Date of Patent: May 17, 2016

(54) LOADING OF WEB RESOURCES

(71) Applicant: CLOUDFLARE, INC., San Francisco, CA (US)

(72) Inventors: Christopher Stephen Joel, San Francisco, CA (US); Jason Thomas Walter Benterou, Burlingame, CA (US); Lee Hahn Holloway, Santa Cruz, CA (US); Matthew Browning Prince, San Francisco, CA (US); Ian Gerald Pye, Santa Cruz, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 13/648,203

(22) Filed: Oct. 9, 2012

(65) Prior Publication Data

US 2013/0041946 A1  Feb. 14, 2013

Related U.S. Application Data

(63) Continuation of application No. 13/253,033, filed on Oct. 4, 2011, now Pat. No. 8,285,808.

(60) Provisional application No. 61/488,699, filed on May 20, 2011.

(51) Int. Cl.
  *G06F 15/16* (2006.01)
  *G06F 15/00* (2006.01)
  *G06F 17/30* (2006.01)

(52) U.S. Cl.
  CPC ............................ *G06F 17/30905* (2013.01)

(58) Field of Classification Search
  USPC ......... 709/203, 213, 209, 224, 233, 245, 246, 709/226, 217, 235
  See application file for complete search history.

(56) References Cited

U.S. PATENT DOCUMENTS

| | | | |
|---|---|---|---|
| 5,826,025 A | 10/1998 | Gramlich | |
| 6,104,716 A | 8/2000 | Crichton et al. | |
| 6,108,703 A | 8/2000 | Leighton et al. | |
| 6,170,012 B1 | 1/2001 | Coss et al. | |
| 6,286,046 B1 | 9/2001 | Bryant | |
| 6,353,855 B1 | 3/2002 | Hendren, III | |
| 6,389,462 B1 | 5/2002 | Cohen et al. | |

(Continued)

OTHER PUBLICATIONS

Non-Final Office Action, U.S. Appl. No. 13/253,033, dated Jan. 30, 2012, 10 pages.

(Continued)

*Primary Examiner* — Jude Jean Gilles
(74) *Attorney, Agent, or Firm* — Nicholson De Vos Webster & Elliott LLP

(57) ABSTRACT

A method and apparatus for improving loading of web resources. A server receives a request for a Hypertext Markup Language (HTML) document requested by a client network application. The server retrieves the requested document. The server automatically modifies objects referenced in the HTML document that have an external source such that loading of those objects by the client network application will be deferred. The server inserts a client-side script loader or a reference to the client-side script loader into the HTML document. The client-side script loader is configured to, when executed by the client network application, attempt to load the objects that have been deferred. The server transmits the modified HTML document to the client network application.

24 Claims, 15 Drawing Sheets

(56) References Cited

U.S. PATENT DOCUMENTS

| | | | |
|---|---|---|---|
| 6,510,461 B1* | 1/2003 | Nielsen | 709/224 |
| 6,654,789 B1 | 11/2003 | Bliss et al. | |
| 6,820,133 B1 | 11/2004 | Grove et al. | |
| 7,058,633 B1 | 6/2006 | Gnagy et al. | |
| 7,103,651 B2 | 9/2006 | Bohannon et al. | |
| 7,127,493 B1 | 10/2006 | Gautier | |
| 7,178,166 B1 | 2/2007 | Taylor et al. | |
| 7,231,458 B2 | 6/2007 | Tenereillo et al. | |
| 7,240,100 B1 | 7/2007 | Wein et al. | |
| 7,269,649 B1 | 9/2007 | Brown et al. | |
| 7,330,908 B2* | 2/2008 | Jungck | 709/246 |
| 7,363,582 B2 | 4/2008 | Sylthe et al. | |
| 7,366,793 B2 | 4/2008 | Kenner et al. | |
| 7,373,500 B2 | 5/2008 | Ramelson et al. | |
| 7,392,325 B2 | 6/2008 | Grove et al. | |
| 7,395,355 B2 | 7/2008 | Afergan et al. | |
| 7,409,708 B2 | 8/2008 | Goodman et al. | |
| 7,418,733 B2 | 8/2008 | Connary et al. | |
| 7,424,741 B1 | 9/2008 | Grimm et al. | |
| 7,430,607 B2 | 9/2008 | Bolles et al. | |
| 7,454,457 B1 | 11/2008 | Lowery et al. | |
| 7,467,408 B1 | 12/2008 | O'Toole | |
| 7,480,699 B2 | 1/2009 | Alam et al. | |
| 7,508,767 B2 | 3/2009 | Shinomiya | |
| 7,562,153 B2 | 7/2009 | Biliris et al. | |
| 7,584,500 B2 | 9/2009 | Dillon et al. | |
| 7,606,915 B1 | 10/2009 | Calinov et al. | |
| 7,647,424 B2 | 1/2010 | Kim et al. | |
| 7,684,394 B1 | 3/2010 | Cutbill et al. | |
| 7,689,665 B2* | 3/2010 | Lipton et al. | 709/217 |
| 7,783,741 B2 | 8/2010 | Hardt | |
| 7,827,311 B2 | 11/2010 | Cooley et al. | |
| 7,849,502 B1 | 12/2010 | Bloch et al. | |
| 7,849,507 B1 | 12/2010 | Bloch et al. | |
| 7,895,653 B2 | 2/2011 | Calo et al. | |
| 7,904,959 B2 | 3/2011 | Sidiroglou et al. | |
| 7,936,682 B2 | 5/2011 | Singh et al. | |
| 7,945,678 B1 | 5/2011 | Skene | |
| 8,015,605 B2 | 9/2011 | Yegneswaran et al. | |
| 8,024,468 B2 | 9/2011 | Raciborski et al. | |
| 8,028,091 B1* | 9/2011 | Kleinfelter | H04L 29/12066 709/204 |
| 8,065,722 B2 | 11/2011 | Barford et al. | |
| 8,112,471 B2 | 2/2012 | Wei et al. | |
| 8,127,356 B2 | 2/2012 | Thiele et al. | |
| 8,141,132 B2 | 3/2012 | Oliver et al. | |
| 8,201,081 B2 | 6/2012 | Stroe et al. | |
| 8,275,790 B2 | 9/2012 | Fredricksen et al. | |
| 8,285,808 B1* | 10/2012 | Joel et al. | 709/213 |
| 8,286,246 B2 | 10/2012 | Zhou et al. | |
| 8,375,449 B1 | 2/2013 | Zhou et al. | |
| 8,381,292 B1 | 2/2013 | Warner et al. | |
| 8,443,450 B1 | 5/2013 | Zhou et al. | |
| 8,468,597 B1 | 6/2013 | Warner et al. | |
| 8,489,670 B1* | 7/2013 | Fletcher et al. | 709/203 |
| 2002/0019821 A1* | 2/2002 | Rosenbluth | G06Q 10/02 1/1 |
| 2002/0042841 A1 | 4/2002 | Nishio et al. | |
| 2002/0087696 A1 | 7/2002 | Byrnes | |
| 2002/0124101 A1 | 9/2002 | Schaeck | |
| 2002/0133509 A1 | 9/2002 | Johnston et al. | |
| 2002/0165466 A1 | 11/2002 | Givens et al. | |
| 2003/0014539 A1 | 1/2003 | Reznick | |
| 2003/0023754 A1 | 1/2003 | Eichstadt et al. | |
| 2003/0055994 A1 | 3/2003 | Herrmann et al. | |
| 2003/0069968 A1 | 4/2003 | O'Neil et al. | |
| 2003/0079027 A1 | 4/2003 | Slocombe et al. | |
| 2003/0135548 A1 | 7/2003 | Bushkin | |
| 2003/0177196 A1 | 9/2003 | Bhasin et al. | |
| 2003/0208570 A1 | 11/2003 | Lapidous | |
| 2003/0208600 A1 | 11/2003 | Cousins | |
| 2003/0225873 A1 | 12/2003 | Wade | |
| 2004/0006710 A1 | 1/2004 | Pollutro et al. | |
| 2004/0015725 A1 | 1/2004 | Boneh et al. | |
| 2004/0044912 A1 | 3/2004 | Connary et al. | |
| 2004/0059951 A1 | 3/2004 | Pinkas et al. | |
| 2005/0005027 A1 | 1/2005 | Drouet et al. | |
| 2005/0018618 A1 | 1/2005 | Mualem et al. | |
| 2005/0108517 A1 | 5/2005 | Dillon | |
| 2005/0114453 A1 | 5/2005 | Hardt | |
| 2005/0120113 A1 | 6/2005 | Bunch et al. | |
| 2005/0120201 A1 | 6/2005 | Benaloh et al. | |
| 2005/0188079 A1 | 8/2005 | Motsinger et al. | |
| 2005/0188080 A1 | 8/2005 | Motsinger et al. | |
| 2005/0188221 A1 | 8/2005 | Motsinger et al. | |
| 2005/0267869 A1 | 12/2005 | Horvitz et al. | |
| 2006/0095578 A1 | 5/2006 | Paya et al. | |
| 2006/0101516 A1 | 5/2006 | Sudaharan et al. | |
| 2006/0136374 A1 | 6/2006 | Shelest et al. | |
| 2006/0218289 A1 | 9/2006 | Assad | |
| 2006/0253458 A1 | 11/2006 | Dixon et al. | |
| 2006/0288119 A1 | 12/2006 | Kim et al. | |
| 2007/0022082 A1 | 1/2007 | Azagury et al. | |
| 2007/0039053 A1 | 2/2007 | Dvir | |
| 2007/0050703 A1* | 3/2007 | Lebel | 715/513 |
| 2007/0097976 A1 | 5/2007 | Wood et al. | |
| 2007/0101405 A1 | 5/2007 | Engle et al. | |
| 2007/0130151 A1 | 6/2007 | Wiles | |
| 2007/0143496 A1 | 6/2007 | Golovinsky et al. | |
| 2007/0180147 A1 | 8/2007 | Leigh | |
| 2007/0186282 A1 | 8/2007 | Jenkins | |
| 2007/0198531 A1 | 8/2007 | Lim et al. | |
| 2007/0255821 A1 | 11/2007 | Ge et al. | |
| 2007/0266145 A1 | 11/2007 | Nesbitt et al. | |
| 2007/0271614 A1 | 11/2007 | Capalik | |
| 2007/0283247 A1 | 12/2007 | Brenneman et al. | |
| 2008/0005659 A1 | 1/2008 | Fujimaki | |
| 2008/0016570 A1 | 1/2008 | Capalik | |
| 2008/0072293 A1 | 3/2008 | D'Urso | |
| 2008/0077982 A1 | 3/2008 | Hayler et al. | |
| 2008/0109657 A1 | 5/2008 | Bajaj et al. | |
| 2008/0183573 A1 | 7/2008 | Muschetto | |
| 2008/0263670 A1 | 10/2008 | Stavrica | |
| 2008/0282338 A1 | 11/2008 | Beer | |
| 2008/0301766 A1* | 12/2008 | Makino et al. | 726/1 |
| 2009/0083244 A1* | 3/2009 | Li et al. | 707/4 |
| 2009/0089119 A1 | 4/2009 | Ranjan | |
| 2009/0089417 A1 | 4/2009 | Giffin et al. | |
| 2009/0089657 A1 | 4/2009 | Davis | |
| 2009/0144421 A1 | 6/2009 | Bunch | |
| 2009/0144829 A1 | 6/2009 | Grigsby et al. | |
| 2009/0287653 A1 | 11/2009 | Bennett | |
| 2009/0292925 A1 | 11/2009 | Meisel | |
| 2009/0300162 A1 | 12/2009 | Demarie et al. | |
| 2009/0300206 A1 | 12/2009 | Todorov | |
| 2009/0328208 A1 | 12/2009 | Peters | |
| 2010/0031315 A1 | 2/2010 | Feng et al. | |
| 2010/0067377 A1 | 3/2010 | Wang et al. | |
| 2010/0076851 A1 | 3/2010 | Jewell | |
| 2010/0077444 A1 | 3/2010 | Forristal | |
| 2010/0138921 A1 | 6/2010 | Na et al. | |
| 2010/0146259 A1* | 6/2010 | Tatham | 713/152 |
| 2010/0169465 A1 | 7/2010 | Amidon et al. | |
| 2010/0180333 A1 | 7/2010 | Bono et al. | |
| 2010/0229223 A1 | 9/2010 | Shepard et al. | |
| 2010/0242106 A1 | 9/2010 | Harris et al. | |
| 2010/0250779 A1 | 9/2010 | B'Far et al. | |
| 2010/0274645 A1 | 10/2010 | Trevithick et al. | |
| 2010/0293448 A1 | 11/2010 | Rand et al. | |
| 2010/0325287 A1 | 12/2010 | Jagadeeswaran et al. | |
| 2011/0029899 A1 | 2/2011 | Fainberg et al. | |
| 2011/0137973 A1 | 6/2011 | Wei et al. | |
| 2011/0209076 A1 | 8/2011 | Saxena et al. | |
| 2011/0231482 A1 | 9/2011 | Benna | |
| 2011/0282997 A1 | 11/2011 | Prince et al. | |
| 2011/0283359 A1 | 11/2011 | Prince et al. | |
| 2011/0296509 A1 | 12/2011 | Todorov | |
| 2012/0022942 A1 | 1/2012 | Holloway et al. | |
| 2012/0023090 A1 | 1/2012 | Holloway et al. | |
| 2012/0030559 A1 | 2/2012 | Manion et al. | |
| 2012/0054316 A1 | 3/2012 | Piazza et al. | |
| 2012/0066586 A1 | 3/2012 | Shemesh | |
| 2012/0066759 A1 | 3/2012 | Chen et al. | |
| 2012/0069845 A1 | 3/2012 | Carney et al. | |

(56) References Cited

U.S. PATENT DOCUMENTS

| | | |
|---|---|---|
| 2012/0096558 A1 | 4/2012 | Evrard |
| 2012/0116896 A1 | 5/2012 | Holloway et al. |
| 2012/0117239 A1 | 5/2012 | Holloway et al. |
| 2012/0117458 A1 | 5/2012 | Holloway et al. |
| 2012/0117641 A1 | 5/2012 | Holloway et al. |
| 2012/0117649 A1 | 5/2012 | Holloway et al. |
| 2012/0226972 A1 | 9/2012 | Fainberg et al. |
| 2012/0254333 A1 | 10/2012 | Chandramouli et al. |
| 2013/0041946 A1* | 2/2013 | Joel et al. .................. 709/203 |
| 2013/0145421 A1 | 6/2013 | Kougiouris et al. |

OTHER PUBLICATIONS

Notice of Allowance, U.S. Appl. No. 13/253,033, dated Jun. 1, 2012, 9 pages.

International Search Report and Written Opinion, Application No. PCT/US12/38906, dated Nov. 14, 2012, 7 pages.

Roberts P., Phishing Attacks Use Word as Bait, Inforworld, May 29, 2006; 28(22):18, Available from: Internet and Personal Computing Abstracts, Ipswich, MA., Accessed Mar. 4, 2013, p. 18.

Enhanced Security Web Proxy and Reverse Web Proxy; Intellectual Property (IP) Publication, Nov. 4, 2008; Web Jul. 17, 2013, 7 pages, downloaded from http://ip.com/pdf/ipcompad/IPCOM000176082D.

A quick guide to SSI (server side includes), 2005, 5 pages, downloaded from http://www.easywebtutorials.com/tutorials/ssi.html.

Belshe, et al., SPDY Protocol, draft-mbelshe-httpbis-spdy-00, Network Working Group, Internet-Draft, Feb. 2012, 51 pages.

Snell, HTTP Multipart Batched Request Format, draft-snell-http-batch-01, Individual Submission, Internet-Draft, Jun. 12, 2009, 7 pages.

* cited by examiner

```
HTTP/1.1 200 OK
Server: cloudflare-nginx
Date: Tue, 03 May 2011 18:55:26 GMT
Content-Type: multipart/bag; boundary=3868cbcfd698fb5d
Transfer-Encoding: chunked
Connection: keep-alive --3868cbcfd698fb5d
Bag: 257|222|-1|200|text/bag-manifest 0:http://www.example.com/small1.js
1:http://www.example.com/pause1.js.php
2:http://www.example2.com/small3.js
3:http://www.example3.com/small2.js
4:http://www.example4.com/404.php --3868cbcfd698fb5d
Bag: 79|39|0|200|application/x-javascript|7200 function small1(bleh) { return bleh;
}
--3868cbcfd698fb5d
Bag: 79|39|2|200|application/x-javascript|7200 function small3(bleh) { return bleh;
}
--3868cbcfd698fb5d
Bag: 79|39|3|200|application/x-javascript|7200 function small2(bleh) {return bleh;
}
--3868cbcfd698fb5d
Bag: 44|0|4|404|text/html; charset=iso-8859-1|7200
--3868cbcfd698fb5d
Bag: 79|39|1|200|application/x-javascript|7200 function pause1(bleh) {return bleh;
}
--3868cbcfd698fb5d--
```

FIG. 12

LOADING OF WEB RESOURCES

CROSS-REFERENCE TO RELATED APPLICATIONS

This application is a continuation of application Ser. No. 13/253,033, filed Oct. 4, 2011, which claims the benefit of U.S. Provisional Application No. 61/488,699, filed May 20, 2011, which are hereby incorporated by reference.

FIELD

Embodiments of the invention relate to the field of network processing; and more specifically, to improving the performance of loading web resources.

BACKGROUND

A web page is made up of a number of objects. These objects can include the HTML of the page, the images, the CSS that defines the layout, and also any client-side scripting code (e.g., Javascript, VBScript). Each of the non-HTML objects is loaded after the initial HTML of the page is loaded. In other words, the web browser initially fetches the HTML, then it requests all the other objects that are included in the HTML.

This creates a number of challenges. One is that each request for an object typically requires a separate TCP connection to be setup and then torn down when the transaction is complete, which is time consuming Another challenge is that an object included in the page (e.g., a client-side scripting code or other object with an external source) can effectively block the rendering of the page while it is executed. Since client-side scripts can alter the way the page is drawn, the client (e.g., web browser) defers rendering the page until after the script has loaded and executed before the basic HTML is rendered. The result is that pages load more slowly. For example, a page may partially load and then stall while waiting for a non-HTML object to render. This problem can be amplified when the page includes multiple objects hosted on multiple domains, which typically requires multiple TCP connections be established in order to access those objects.

SUMMARY

A method and apparatus for improving the performance of loading web resources is described. In one embodiment of the invention, the loading of objects that have an external source (e.g., objects that have a "src" attribute) is deferred until the HTML has rendered. For example, the loading of client-side scripts or other objects (e.g., CSS, images, styles, classes, Flash elements, sound files, etc.) that have an external source is deferred until the HTML has rendered. Thus, the HTML content of the page is rendered, and then the deferred objects are loaded thereby reducing the perceived loading time of the web page since the core content of the HTML page is loaded before the deferred objects.

In one embodiment of the invention, multiple object queries (e.g., multiple client-side script queries) are packaged into a single request using a single TCP connection to a proxy server thereby reducing the number of TCP connections required. The responses for the multiple object queries are streamed to the client through the single TCP connection as they are retrieved (which means that that the requested objects may be returned asynchronously). This reduces the time for loading the page (in particular the client-side scripts) that would have been made by initiating multiple TCP requests for multiple resources.

BRIEF DESCRIPTION OF THE DRAWINGS

The invention may best be understood by referring to the following description and accompanying drawings that are used to illustrate embodiments of the invention. In the drawings:

FIG. 12 illustrates an exemplary package response according to one embodiment.

DESCRIPTION OF EMBODIMENTS

Figure 1:
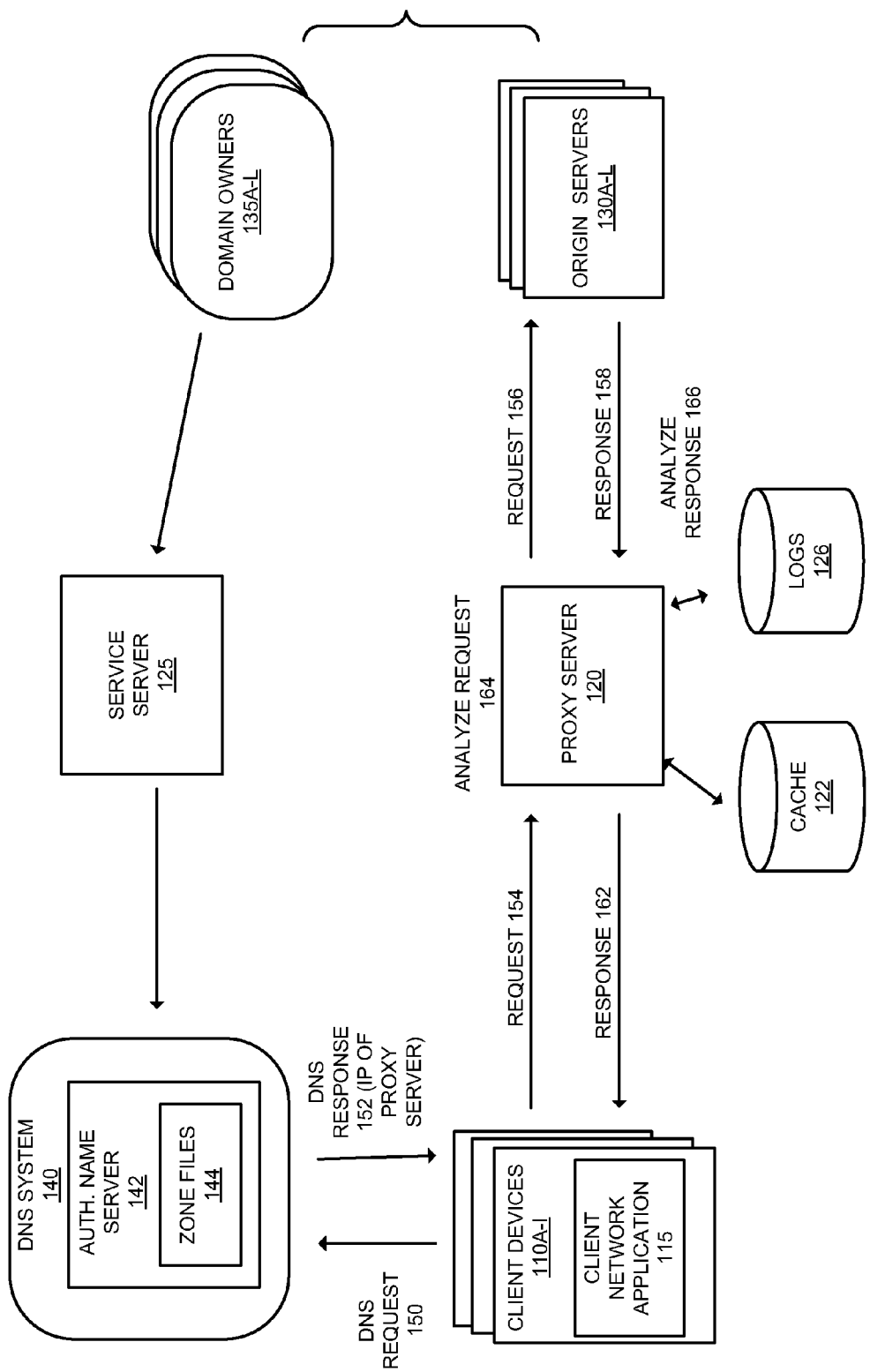
FIG. 1 illustrates an exemplary system in accordance with one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. In the following description and claims, the terms "coupled" along with its derivatives, may be used. "Coupled" is used to indicate that two or more elements, which may or may not be in direct physical or electrical contact with each other, co-operate or interact with each other.

A method and apparatus for improving the performance of loading web resources is described. In one embodiment of the invention, the loading of objects that have an external source (e.g., a "src" attribute) is deferred until the HTML has rendered. For example, the loading of client-side scripts or other objects (e.g., CSS, images, styles, classes, Flash elements, sound files, etc.) that have an external source is deferred until the HTML has rendered. Thus, the HTML content of the page is rendered, and then the deferred objects are loaded thereby reducing the perceived loading time of the web page since the core content of the HTML page is loaded before the deferred objects.

In one embodiment of the invention, multiple object queries (e.g., multiple client-side script queries) are packaged into a single TCP request to a proxy server thereby reducing the number of TCP connections required. The responses for the multiple object queries are streamed to the client through the single TCP connection as they are retrieved (which means that that the requested objects may be returned asynchronously). This reduces the time for loading the page (in particular the client-side scripts) that would have been made by initiating multiple TCP requests for multiple resources.

Some embodiments of the invention are employed using an Internet-based proxy system. The page acceleration service is available over the Internet and does not require customers (e.g., owners of a domain and/or personnel working on behalf of domain owner) to install hardware or software and provides at least a portion of the improved loading of web resources described herein (sometimes referred to as page acceleration). Some embodiments of the invention employ a proxy server that modifies HTML documents to enable them for page acceleration, which will be described in greater detail later herein.

In some embodiments, the proxy server is provisioned through DNS (Domain Name System). For example, DNS record(s) are changed for a website such that DNS resolution requests for the corresponding domain points to the proxy server. In some embodiments, the authoritative name server of a domain is changed to an authoritative name server of the service and individual DNS records are changed to point to the proxy server. In other embodiments, customers of the service change individual DNS records to point to a proxy server (or point to other domain(s) that point to a proxy server of the service). For example, the customers may change their DNS records to point to a CNAME that corresponds with a proxy server of the service.

In another embodiment, the visitors (e.g., users of client devices) change their DNS provider to a DNS provider of the service (typically changed through operating system settings). DNS requests therefore are sent to the DNS provider of the service, which point to the proxy server regardless of whether the domain in the DNS requests resolves to the proxy server. In order to access the origin server, the proxy server looks up the authoritative name server and performs DNS resolution as normal.

In another embodiment, the client network application (e.g., browsers) are configured to transmit web requests to the proxy server regardless of whether the requests resolve to the proxy server. The client network application may be configured with an exclusion list that lists domains for which requests are not sent to the proxy server (all other requests are) or an inclusion list that lists domains for which requests are to be sent to the proxy server (all other requests are not sent to the proxy server).

FIG. 1 illustrates an exemplary system in accordance with one embodiment of the invention. The domain owners 135A-L are customers and their domains point to the proxy server 120. The authoritative name servers for each the domains of the domain owners 135A-L have been changed to the authoritative name server 142, which is associated with the service provided through the proxy server 120. It should be understood that the backup authoritative name servers serving the domains may also be changed. The zone file records for the domains of the domain owners 135A-L are also changed such that DNS resolution requests for the domains owned by the domain owners 135A-L, which correspond with the origin servers 130A-L respectively, resolve to the proxy server 120. In one embodiment, customers (e.g., the domain owners 135A-L or other entity (e.g., web administrators) on behalf of the domain owners 135A-L) may use the service server 125 to change their authoritative name server to the authoritative name server 142 and change their zone file records to have their domain point to the proxy server 120.

The service server 125, operated by the service, provides a set of tools and interfaces for the domain owners 135A-L and is accessible over the Internet. For example, the service server 125, among other things, allows the domain owners 135A-L to register for the service. For example, the service server 125 may includes tools to assist the domain owners 135A-L in changing their authoritative name servers and zone file record(s). It should be understood, however, that the domain owners 135A-L may change their authoritative name server and zone file record(s) without use of the service server 125 (i.e., they may directly change the authoritative name server and zone file).

The DNS system 140 is used to refer to the DNS system as a whole and includes multiple DNS servers to resolve DNS requests. As illustrated, the DNS system 140 includes the authoritative name server 142, which is an authoritative name server for the service. Thus, the authoritative name server 142 is the authoritative name server for the domains corresponding to the origin servers 130A-L. Accordingly, when the DNS system 140 resolves a request for a domain corresponding to one of the origin servers 130A-L, the authoritative name server 142 provides the authoritative answer. It should be understood that the DNS system 140 includes more DNS servers (e.g., preferred domain servers, top-level domain name servers, other domain servers) than illustrated. It should also be understood that there may be multiple authoritative web servers for the service and they may be geographically distributed.

The client devices 110A-I are computing devices (e.g., laptops, workstations, smartphones, palm tops, mobile phones, tablets, gaming systems, set-top boxes, etc.) that are capable of accessing network resources. Each of the client devices 110A-I include a client network application 115, which is capable of accessing network resources. Users at the client devices 110A-I request network resources (e.g., HTML pages, images, word processing documents, PDF files, movie files, music files, or other computer files) through a client network application such as a web browser or other application (e.g., FTP client, SSH client, Telnet client, etc.).

The origin servers 130A-L are computing devices that serve network resources (e.g., HTML pages, images, word processing documents, PDF files, movie files, music files, or other computer files). The origin servers 130A-L respond to requests for network resources (e.g., from an HTTP request, FTP request, telnet request, etc.). Although not illustrated in FIG. 1, it should be understood that the network resources of the origin servers 130A-L may be stored separately from the device that responds to the requests.

The proxy server 120 is a computing device that is situated between the client devices 110A-I and the origin servers 130A-L and provides many of the features of the page acceleration service. Certain network traffic passes through the proxy server 120 (traffic sent from the client devices 110A-I and/or traffic sent from the origin servers 130A-L). Based on at least in part on this traffic, the proxy server 120 provides at least a portion of the improved loading of web resources which will be described in greater detail later herein.

The client devices 110A-I request DNS resolution when a domain name is used or requested by their client network application and is not known (e.g., is not in a local DNS cache or the DNS record in its local cache has expired). Consider the following example, where a user of the client device 110A enters the website example.com into a web browser of the device (the origin server 130A serves the website example.com). If the client device 110A does not know the IP address of example.com, (e.g., the cache on the client device 110A does not have an entry for example.com or it has expired), the client device makes a DNS request 150 to the DNS system 140 for the IP address for example.com. The domain owner of example.com has changed its authoritative name server to the authoritative name server 142, and the DNS zone file has been changed so that the IP address returned by the authoritative name server 142 will be that of the proxy server 120. As such, the DNS system 140 performs a recursive or iterative DNS process until the authoritative name server 142 returns the IP address for the proxy server 120 in the DNS response 152.

Sometime after the DNS resolution is complete and the client device 110A learns the IP address that points to example.com (which is the IP address of the proxy server 120), the client device 110A makes the request 154 (e.g., an HTTP GET request, an HTTP POST request, other HTTP request method, or other request for an action to be performed on an identified resource belonging to an origin server), which is transmitted to the proxy server 120.

The proxy server 120 analyzes the request at operation 164 and may perform a set of one or more request related actions based on the results of the analyzing. For example, if the requested content is in the cache 122 and is not expired (e.g., its TTL value has not expired), the proxy server 120 may return the requested content to the client device 110A in the response 162 without querying an origin server. If however, the requested content is not in the cache 122 or has expired, the proxy server 120 transmits the request to the origin server 130A on behalf of the client device 110A at operation 156. The proxy server 120 receives the response 158 (e.g., an HTTP response) that may include the requested content (e.g., an HTML document), or an error code (e.g., 404 error, 5XX error, etc.).

After receiving the response 158, the proxy server 120 analyzes the response (at the analyzing response operation 166) and determines a set of one or more response related actions to perform based on the results of the analyzing response operation 166. For example, assuming that the response includes the requested content (an HTML document in this example), the proxy server 120 modifies the HTML document to improve the loading performance of the web page (the HTML document and its objects). In one embodiment, the proxy server 120 inserts a reference to a loader client-side script (e.g., Javascript) (hereinafter referred as "loader") in the <head> portion of the HTML returned from the origin server. The loader can also alternatively be inserted elsewhere into the HTML. The functionality of the loader will be described in greater detail later herein. In one embodiment, the loader, when executed by the client network application, begins a loop which waits for the page to be "onready" or be finished loading. In one embodiment, if client network application does not support the onready element (e.g., if the client network application is old), the loader, when executed, starts a timer that delays execution of the rest of the page for a pre-defined amount of time.

The proxy server 120 also scans the rest of the HTML for client-side script objects (e.g., by scanning for <script> tags). The proxy server 120 modifies the script objects in such a way to delay them from being executed by the client network application. For example, the proxy server 120 changes the type attribute of the script objects from its standard form (e.g., "text/javascript") to a non-standard form (e.g., to "text/djs") in order to delay the script from being executed. In some embodiments, the proxy server 120 also changes the "src" attribute of the script object (if the script object has a "src" attribute) and/or makes other modifications in order to prevent the client network applications from loading/executing that particular script. This causes the code within the <script> tag to be ignored by the client network application so that script does not block or delay page rendering. In some embodiments, the proxy server 120 also scans the HTML document for other objects that have a "src" attribute and modifies them such that the request for the source of those objects is deferred or loaded through the proxy server 120.

In an alternative embodiment, instead of the proxy server 120 modifying the objects to defer their loading, the loader, when executed by the client network application, modifies the objects to defer them from being executed in a similar way as the proxy server. For example, the loader may intercept the objects before they are loaded in order to modify them to defer them from being executed.

In some embodiments, the loader, when executed by the client network application, sends a request to the service asking for the standard object package (a package is a set of one or more objects) for the page that is being loaded (hereinafter referred to a "standard package request"). In an alternative embodiment, the loader requests the standard object package for the entire site. A standard object package is a collection of one or more objects that are known and/or typically loaded on the page and/or site. The objects may include a combination of one or more of the following: client-side scripts, CSS, images, styles, classes, Flash elements, sound files, or other objects. The objects in the standard package may have the source domain as the origin server (i.e., located on the same domain as the origin server) or have a different source domain (i.e., located on a different domain than the origin server).

Some client network applications support local storage (sometimes referred to as DOM storage) that allows for persistent data storage in addition to a standard client network application cache. There is typically more storage capacity in local storage than in client network application cache. Local storage is domain specific and typically each domain has a certain amount of storage space whereas client network application cache is not domain specific and has a certain amount of storage space regardless of domain. The domain has control over what is stored in local storage whereas the client network application has control over the browser cache.

In one embodiment, the loader only requests the standard object package if it is being executed by a client network application that does not support local storage. For example, the loader checks whether a local storage variable is supported by the client network application to determine whether it supports local storage. The package request as well as the package are cacheable.

If the standard package of objects is not in local storage or cache, the package request is relayed over the network to the proxy server 120. The standard package request includes information about the page/site that is currently being requested. If the standard package requested is in local storage or cache, then the package of objects is fetched from the cache. In some embodiments of the invention, the standard package request is made immediately. In other embodiments of the invention, the standard package request is not made until after the page signals the "onready" event or the loader timer expires. In response to receiving a standard package request, the proxy server 120 returns a multi-part response that includes objects that are known to be loaded on the page (and which it could locate).

The objects returned in a response to the standard package request may be included in the page and are cached (if caching is supported). It should be understood that the objects in the standard package of objects may differ than the object(s) of the page being loaded by the client network application. For example, object(s) may not be included in the standard package of objects and/or the standard package of objects may include object(s) that are not part of the page being loaded by the client network application. As a result, additional objects may need to be requested (if not otherwise locally available) and/or some objects may need to be excluded by the client network application. The loader may record those objects that need to be requested.

In addition to or in lieu of requesting the standard object package, the loader, when executed by the client network application, may request a dynamic object package for one or more of the deferred objects that are not locally available to the client network application (e.g., not in local storage, in cache, or in local memory as being returned from a standard package request). If a deferred object is locally available and its time to live (TTL) has not expired, then the loader reads it locally. If an object is not locally available or its TTL has expired, then the loader includes a URL for that object on a list for a dynamic object package. The deferred object(s) may be hosted by different domains. Thus, a dynamic object package request may include URLs for multiple objects which may be hosted by multiple domains. The dynamic object package request is sent to the proxy server 120 in a single request. Thus, the loader essentially groups multiple object queries into a single request using a single TCP connection thereby reducing the number of TCP connections otherwise required to request and receive those objects. In one embodiment, the loader collects the URLs for inclusion in the dynamic object package request and causes the request to be transmitted after the onready event is triggered or the loader's timer has expired. In an alternative embodiment of the invention, each request is made to the proxy server 120 one at a time. In another embodiment of the invention or if an error in the proxy service is detected, the requests are made individually and not through the proxy server 120 but directly to the original domain.

Responsive to receiving a dynamic object package request that includes a list of URLs corresponding to objects from the client network application, the proxy server 120 determines whether that package of objects has been requested before and, if so, whether a cached copy of the objects for the package exists in the cache 122 and its TTL has not expired. If so, the proxy server 120 returns the cached copy. In one embodiment, the cached copy of the package is returned on the same single TCP connection used to make the dynamic object package request.

If a cached copy does not exist, the proxy server 120 splits the individual URLs from the list and checks for each corresponding object in its cache 122. If the URL's object is on the proxy server's cache 122, and the cached object has not expired, then it is included in a file to be sent to the client and is streamed on the same single TCP connection. If the object of the URL is not in the proxy server's cache 122, or the cached object has expired, then the proxy server 120 requests the object directly from the URL via the network. When the proxy server 120 receives a response from an origin server with an object, the object is included in the response, and the object is cached with a TTL value. The proxy server 120 separates each object in the file such that the client network application can locate each different object in the file and potentially store each different object in local storage (if local storage is supported by that client network application). In one embodiment, the proxy server 120 forms a response that has an overall header and a multipart divider defined in the header that separates different objects in the response. In another embodiment, the proxy server 120 forms a response that includes a footer index that specifies each object in the response and the number of bytes that offset that object from other objects in the response. The response may either be returned all at once (for example, if it already existed as a whole in the cache) or may be returned as parts are received (in other words, parts of the response may be returned as a stream and, potentially, asynchronously as various objects are fetched URL requests). FIG. 12 illustrates an exemplary format of a dynamic object package response according to one embodiment.

If the proxy server 120 receives an error message from the origin server (e.g., 404 error, 5XX error, etc.) or otherwise was not able to retrieve a requested object, the proxy server 120 includes an error object in the dynamic object package response. By sending an error object, the proxy server 120 obscures the error from the client network application and keeps the client network application from waiting for the response to that object (which could cause the client network application to hang and prevent other portions of the page from loading). In addition, the receipt of an error object in a dynamic object package response allows the client network application to begin the process of skipping the object, displaying an error message, or establishing a separate connection in an attempt to request the object directly from the corresponding origin server (bypassing the proxy server).

The loader listens for the response for its request for object(s). If the entire list of objects is returned, the client network application locates each different object as specified. For example, in one embodiment the loader uses the multipart divider to separate the various objects by jumping to offsets as specified. As another example, in one embodiment, the loader uses the footer to separate the various objects by jumping to offsets as specified. If the response is returned as a stream or in parts, the client network application can separate the various objects based on the multi-part separator. If a requested object is not in the response, the loader requests the object directly from the URL (bypassing the proxy server 120).

For each object that is returned, the loader associates the object with the one or more tags on the page that reference the object. In one embodiment, the objects are loaded in order that they were requested. In an alternate embodiment, the objects are loaded in an order specified by an attribute field associated with each object as it was originally included on the page. In one embodiment, the loader causes the objects to be loaded responsive to detecting that the page's onready element (or equivalent) has occurred or otherwise the rest of the HTML page has finished loading.

If the proxy server 120 is unable to retrieve an object from its origin server, it may return an error object to the client network application. The error object may be included in the list of files being streamed to the client network application and may be represented in the response. Responsive to receiving an error object, the loader may cause a request for that object to be sent to the origin server directly (bypassing the proxy server 120).

In one embodiment of the invention, the loader (or another script inserted on the page) may include a call after the page has loaded that sends a manifest of all the objects on the page (Javascript, CSS, Images, styles, classes, Flash elements, sound files, or other objects) and their respective attributes (e.g., size, type, presence in cache, etc.) to the proxy server 120 to be logged. The proxy server 120 stores these logs and/or the logs generated by the loader requesting objects to be preloaded in the log storage 126. The proxy server 120, or an associated server, analyzes these logs in order to create the standard package file. For each object on a page within a website that passes through the proxy server 120, the proxy server 120 creates an index based on a combination of the percentage of pages the object is available on and/or its size. If the index exceeds a specified value, then the proxy server 120 includes the object in the standard package file.

By way of example, an index may be made up of the algorithm of the size of a file divided by the percentage of pages within a website on which it is present. In this case, the lower the number (i.e., the smaller the file or the more likely it is to be requested) the more likely it would be that the file would be included. The index may be adjusted by different weights depending on the priorities (e.g., the size of the file may be assigned a higher priority than its frequency of being accessed if the goal is to minimize bandwidth). In one embodiment, the proxy server 120 generates a table of contents for each standard package file, separates multiple objects in the file by a separator, and includes a footer index with the byte offsets between each object in the file. In another embodiment, the proxy server 120 generates a response that has an overall header that defines a multipart divider and each multi-part segment has its own header and indicates the byte offsets between each object in the file. This file is then cached on the proxy server 120 in the cache 122 and marked with a TTL. In one embodiment of the invention, the file is distributed to multiple proxy servers running in one or more data centers.

While FIG. 1 illustrates a single proxy server 120, in some embodiments the service has multiple proxy servers that are geographically distributed. For example, in some embodiments, the service uses multiple point of presences (POPs). A POP is a collection of networking equipment (e.g., authoritative name servers and proxy servers) that are geographically distributed to decrease the distance between requesting client devices and content. The authoritative name servers have the same anycast IP address and the proxy servers have the same anycast IP address. As a result, when a DNS request is made, the network transmits the DNS request to the closest authoritative name server. That authoritative name server then responds with a proxy server within that POP. Accordingly, a visitor will be bound to that proxy server until the next DNS resolution for the requested domain (according to the TTL (time to live) value as provided by the authoritative name server). In some embodiments, instead of using an anycast mechanism, embodiments use a geographical load balancer to route traffic to the nearest POP. While FIG. 1 illustrates multiple origin servers 130A-L coupled with the proxy server 120, in some embodiments the proxy server is coupled with a single origin server. Moreover, in some embodiments, there are multiple proxy servers providing service for a particular domain. The owner of the proxy server 120 is typically different than the owners of the origin servers 130A-L. In addition, the proxy server 120 is not typically part of the local network of the origin web servers 130A-L. For example, the proxy server 120 is outside of the local area network of the origin web servers 130A-L and is typically not physically accessible by owners/administrators of the origin servers 130A-L.

Figure 2A:
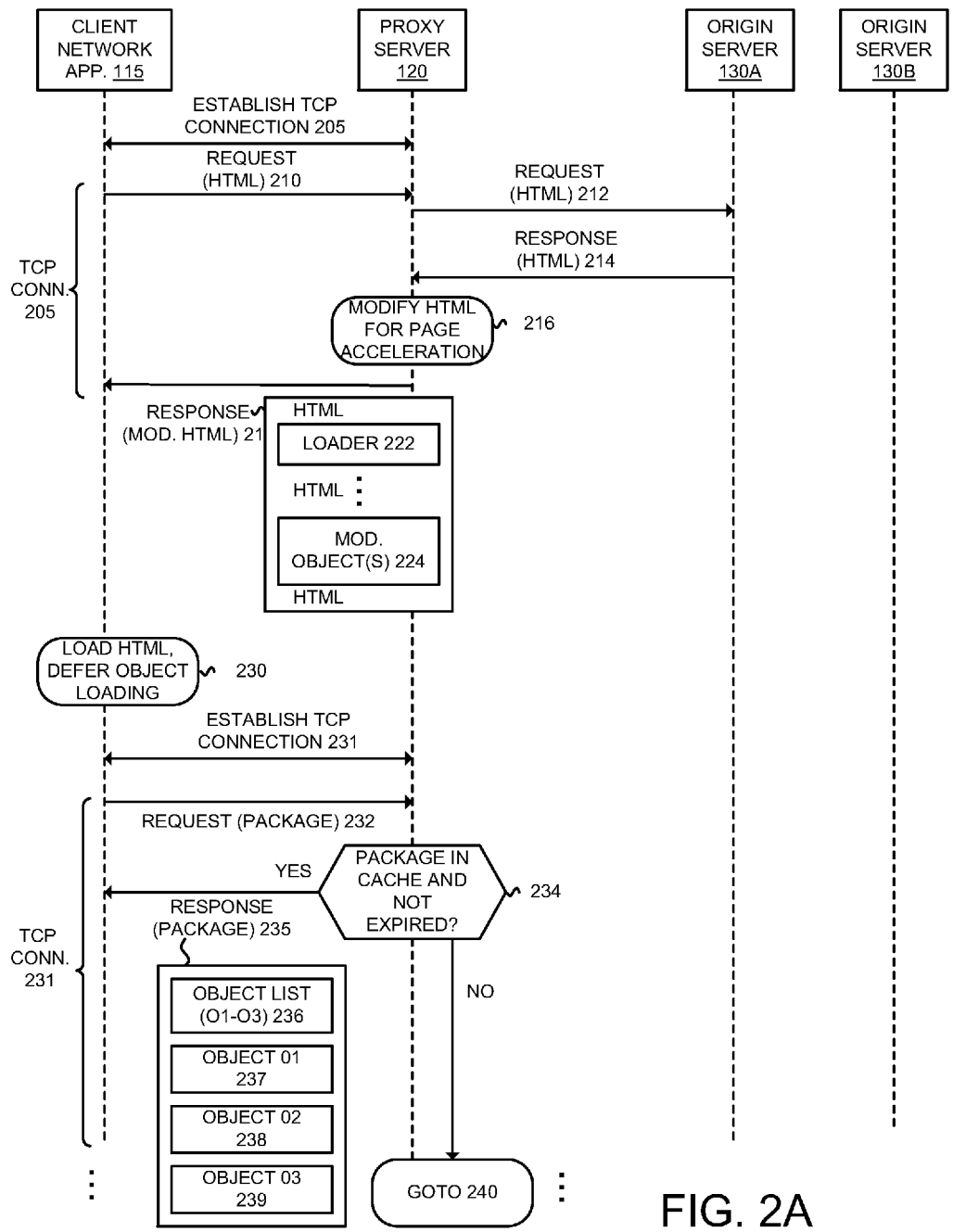
FIGS. 2A-B are data flow diagrams illustrating exemplary operations of the page acceleration service according to one embodiment.
Figure 2B:
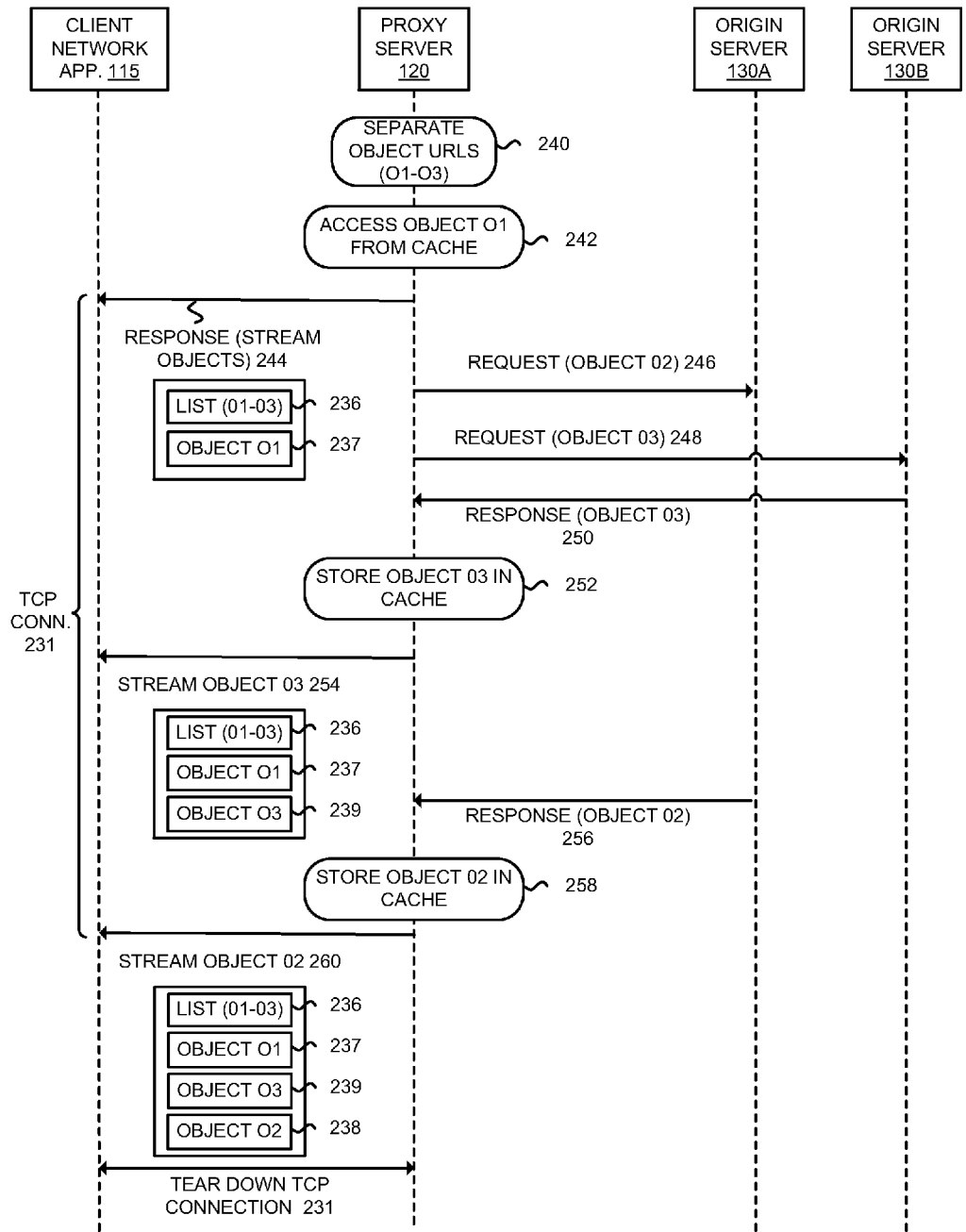

FIGS. 2A-B are data flow diagrams illustrating exemplary operations of the page acceleration service according to one embodiment. The client network application 115 establishes a TCP connection 205 with the proxy server 120 using known techniques. The client network application 115 then sends a request for an HTML document to the proxy server 120. The request for the HTML document may be received by the proxy server 120 due to the domain hosting the HTML document resolving to the proxy server 120. As another example, the client network application 115 may be configured to directly send the request to the proxy server 120 regardless whether the domain hosting the HTML document resolves to the proxy server 120.

Assuming that the proxy server 120 does not have the HTML document in its cache, the proxy server 120 forwards the request 212 to the appropriate origin server 130A for the HTML document. Although not illustrated in order not to obscure understanding of the invention, the proxy server 120 establishes a TCP connection with the origin server 130A. The proxy server 120 then receives a response 214 with the requested HTML document. The proxy server 120 may then store the HTML document in its cache.

The proxy server 120 then modifies the HTML document for page acceleration at operation 216. For example, as described above the proxy server 120 inserts the loader 222 (or a reference to the loader) in the HTML document, and modifies object(s) 224 (e.g., one or more client-side scripts, images, CSS, classes, styles, audio files, video files, or other object) in the HTML document that have an external source (e.g., a "src" attribute) such that the loading of those objects is deferred. The loader 222 and the modified object(s) 224 may be interspersed with non-object HTML code. The proxy server 120 transmits the response 218 that includes the modified HTML document to the client network application 115. The request 210 and the response 218 are transmitted using the TCP connection 205. After receiving the response 218, the TCP connection 205 may be torn down or alternatively may be kept alive. In one embodiment, the proxy server 120 stores the modified HTML document in its cache so that it may respond to future requests for the same HTML document without performing the same modifications and without querying the origin server for the HTML document.

The client network application 155 loads the HTML document received in the response 218 and defers loading the modified object(s) 224 at operation 230. As part of loading and executing the loader 222, the TCP connection 231 is established between the client network application 115 and the proxy server 120. The TCP connection 231 is established so that the deferred objects with an external source can be requested through the proxy server 120.

The loader 222 causes the client network application 115 to request 232 an object package. For illustrative purposes the requested object package may be a standard object package or a dynamic object package. It should be understood that a dynamic object package request may be requested after a standard object package request if the standard object package does not include all of the deferred objects on the page. For purposes of explanation, the objects that are part of the package are the objects O1, O2, and O3. The request 232 is made using the TCP connection 231.

The proxy server 120 determines whether the requested package of objects is in cache and is not expired. If it is, then the proxy server 120 formats and transmits the package response 235 to the client network application 115. The file sent in the response is formatted such that the client network application can locate and access each object in the file and potentially store each different object in local storage (if local storage is supported by that client network application). As illustrated in FIG. 2A, the package response includes an object list 236 (e.g., in an header) that lists what objects are included in the response and identifies where in the response the objects are located. The object O1 237, object O2 238, and object O3 239 is included in the response. The response 235 is made using the TCP connection 231.

If the requested package of objects is not in cache (or the cache as expired for those objects), then the proxy server 120 separates the URLs that correspond to the objects at operation 240. For each of these objects, the proxy server 120 determines whether that object is in its cache and is not expired. If so, the cached copy is used. If it is not in cache or the cache has expired, then the proxy server 120 requests the object from its origin server over the network. For purposes of explanation, the object O1 is available in cache and the objects O1 and O2 are not. At operation 242, the proxy server 120 accesses the object O1 from its cache. The proxy server 120 formats and begins transmitting the response 244 to the client network application 115. The response is streamed using the existing TCP connection 231 (streaming meaning the objects are transmitted to the client network application 115 as or shortly after the proxy server 120 accesses them). The response 244 includes the list of objects 236 and the object O1 237.

Since the object O2 is not available in its cache, the proxy server 120 transmits the request 246 to the origin server 130A for the object O2 (the origin server 130A hosts the object O2). The proxy server 120 also transmits the request 248 to the origin server 130B for the object O3 (the origin server 130B hosts the object O3).

The origin server 130B transmits the response 250 that includes the object O3 before the origin server 130A transmits a response for the object O2. Thus, in this example, the proxy server 120 receives the object O3 before the object O2. The proxy server 120 caches the object O3 in its cache at operation 252. The proxy server 120 also streams 254 the object O3 to the client network application 115 in the response. As illustrated in FIG. 2B, the object O3 239 has been added to the response. It should be understood that the list 236 and the object O1 237 are not retransmitted to the client network application 115. In other words, the proxy server 120 does not transmit a completely new response to the client network application 115 that includes the already transmitted portions of the response (assuming that those portions have been received and acknowledged by the client network application 115). The streaming of the object O3 uses the existing TCP connection 231.

Sometime later, the proxy server 120 receives the response 256 from the origin server 130A with the object O2. The proxy server 120 caches the object O2 in its cache at operation 258. The proxy server 120 also streams 260 the object O2 to the client network application 115 in the response. As illustrated in FIG. 2B, the object O2 238 has been added to the response. The streaming of the object O2 uses the existing TCP connection 231. The TCP connection 231 is then torn down.

Thus, as illustrated in FIGS. 2A-B, multiple object queries are packaged into a single request (e.g., the request 232) using a single TCP connection (e.g., the TCP connection 231) and the objects are included in a single response (e.g., the response 244), which may be transmitted asynchronously and dynamically (as the objects are retrieved by the proxy server) and use the same TCP connection. This reduces the number of TCP connections otherwise required to request and receive those objects which reduces the time required to load the page. In addition, it should be understood that although FIGS. 2A-B illustrate only a single client network application, the proxy server 120 receives and processes requests for many client network applications. As such, the cache of the proxy server 120 becomes accurate and current and many of the objects requested can be directly accessed through its cache without querying the origin servers, which reduces the time required to load the page. In addition, typically the proxy server 120 is located closer to the client devices meaning that a request to the proxy server 120 can typically be answered faster than a request to an origin server (e.g., the proxy server 120 is located on the edge of the network).

Figure 3:
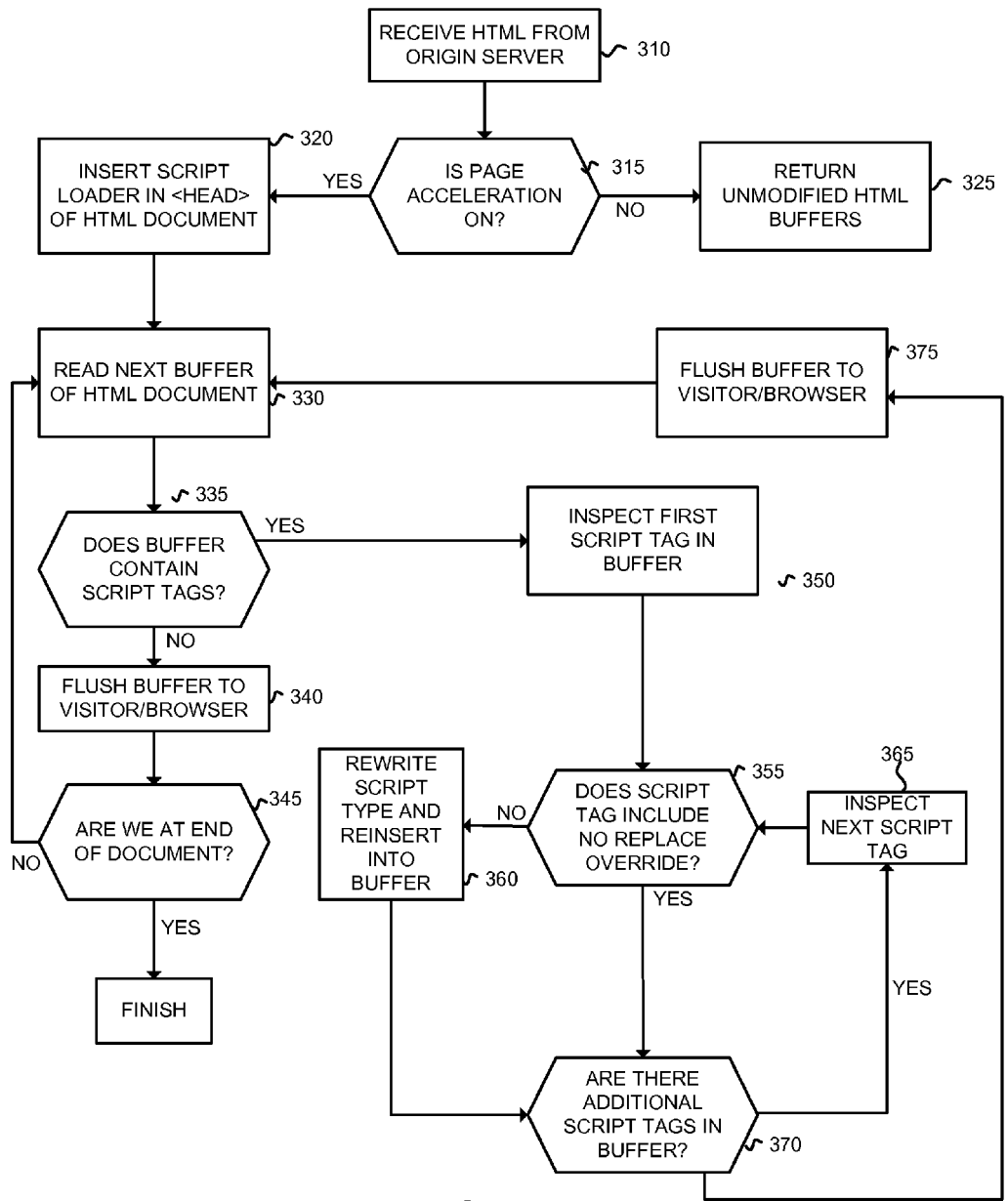
FIG. 3 is a flow diagram illustrating exemplary operations for modifying an HTML document for improved loading performance according to one embodiment.

FIG. 3 is a flow diagram illustrating exemplary operations for modifying an HTML document for improved loading performance according to one embodiment. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams. In particular, the operations described with reference to the flow diagrams are described as being performed by components illustrated in FIG. 1 (e.g., the client network application 115, the proxy server 120, origin servers 130, etc.).

At operation 310, the proxy server 120 receives an HTML document from the origin server 130A. For example, the client networking application 115 of the client device 110A makes a request for an HTML document at a domain that corresponds to the origin servers 130A. The request is directed to the proxy server 120 and the proxy server 120 relays the request to the origin server 130A. In another embodiment, the proxy server 120 retrieves the HTML document from its cache. The HTML document is read into a buffer (or at least a portion of the HTML document that fits within the buffer).

Flow then moves to operation 315 and the proxy server 120 determines whether page acceleration is on. In one embodiment, customers of the service can configure whether they want the page acceleration process turned on for their domain or individual pages. If it is not turned on, then flow moves to operation 325 where the proxy server 120 returns the HTML unmodified. If page acceleration is turned on, then flow moves to operation 320 and the proxy server 120 inserts the loader into the HTML received from the origin server 130. For example, the proxy server 120 inserts the loader into the <head> portion of the HTML. Details regarding the operation of the loader will be described in greater detail later herein. Flow then moves to operation 330.

In one embodiment, in addition to inserting the loader, the proxy server 120 modifies the client-side script objects included in the HTML document in such a way to delay them from being executed by the client network application 115. The proxy server 120 may also modify other objects that have a "src" attribute such that the request for those objects is deferred. At operation 330, the proxy server 120 reads the portion of the HTML document in the buffer and at operation 335 the proxy server 120 determines whether the buffer contains a <script> tag or otherwise includes a client-side script. If it does not contain a <script> tag, then flow moves to operation 340 and the proxy server 120 flushes the portion of the HTML document in the buffer to the client network application 115. Flow then moves to operation 345 where if the proxy server 120 determines that it is at the end of the HTML, flow moves to operation 375 and the operations finish (the entire HTML document has been sent to the client network application 115). If it is not the end of the HTML document, then flow moves back to operation 330 where a next portion of the HTML document is read into the buffer.

If the buffer contains a <script> tag or otherwise includes a client-side script, then flow moves to operation 350 and the proxy server 120 inspects the first script tag in the buffer. Flow then moves to operation 355 where if the proxy server 120 determines that the script tag includes an attribute that indicates that the script should be loaded normally (e.g., the script tag includes a no-replace-override attribute), then flow moves to operation 370, otherwise flow moves to operation 360. In one embodiment, customers of the service may indicate whether scripts should be loaded normally. In one embodiment, customers of the service indicate which scripts should be loaded normally (the loading of the other scripts will be deferred), while in another embodiment customers indicate which scripts should be deferred (the other scripts will be loaded normally).

At operation 370, the proxy server 120 determines whether there are additional script tags in the buffer. If there are not, then flow moves to operation 375 and the proxy server 120 flushes the portion of the HTML document in the buffer to the client network application 115. If there is an additional script tag, then flow moves to operation 365 and the proxy server 120 inspects the next script tag and flow moves to operation 355. If the script tag does not indicate that the script should be loaded normally (e.g., the script tag does not include a no-replace-override attribute), then flow moves to operation 360 and the proxy server 120 rewrites the type attribute of the script to a non-standard form to cause the loading of that script to be deferred. Flow moves from operation 360 to operation 370.

In one embodiment, the proxy server 120 caches the modified HTML document (e.g., in the cache 122) with a TTL value so that future requests for the same HTML document may be retrieved and returned from the cache of the proxy server 120.

The client network application 115 receives the modified HTML document from the proxy server 120. The client network application 115 begins loading the page as the portion of the HTML document is received. In one embodiment, the loader causes object(s) referenced in the HTML document to be deferred from loading until the other parts of the HTML are loaded; while in other embodiments, the loader begins the process of requesting the object(s) referenced in the HTML document in the order in which they appear on the page. As described above, in some embodiments, the loader causes a package request to be sent to the proxy server 120. The loader typically requests the standard object package from the proxy server 120 when the client network application 115 does not support local storage, but may also request the package even if local storage is supported.

Figure 4:
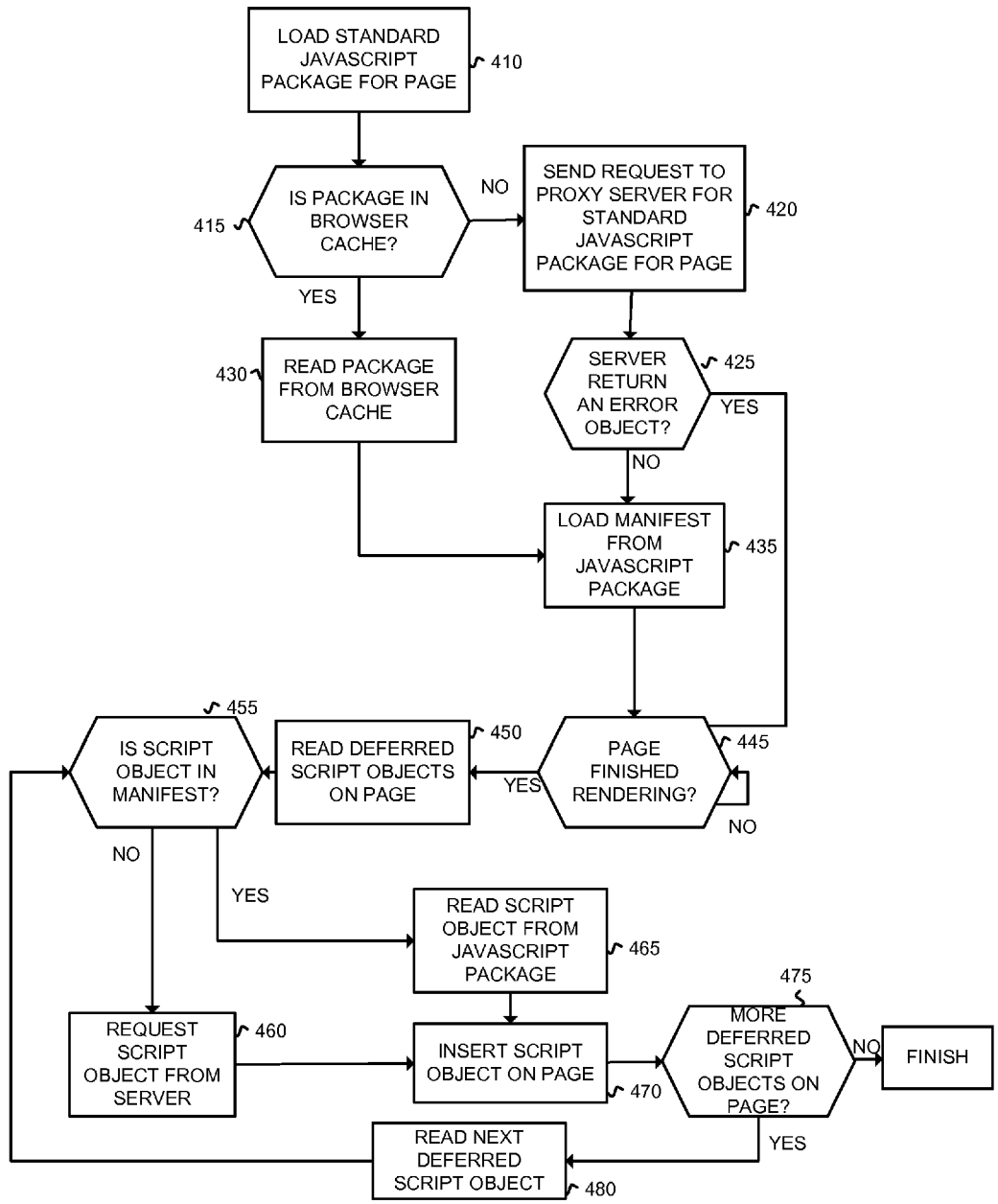
FIG. 4 is a flow diagram illustrating exemplary operations for a client network application requesting a standard package of objects (e.g., client-side scripts) for a site or page according to one embodiment.

FIG. 4 is a flow diagram illustrating exemplary operations for a client network application requesting a standard package of objects (e.g., client-side scripts) for a site or page according to one embodiment. In one embodiment, the operations described with reference to FIG. 4 are performed by a client network application that does not support local storage. For purposes of an example the operations described with reference to FIG. 4 are described with reference to client-side scripts, but it should be understood that similar operations are applicable to other types of objects (e.g., CSS, Images, styles, classes, Flash elements, sound files, or other objects). In one embodiment, the operations described with reference to FIG. 4 are performed responsive to the page being "onready" or otherwise finished loading, while in other embodiments the operations are performed without regard to the page being "onready" or otherwise finished loading.

At operation 410, the loader attempts to load the standard client-side script package for the HTML page. Flow moves to operation 415 where if the package is in the cache of the client network application, then flow moves to operation 430 and the package is read from the cache and flow moves to operation 435, otherwise flow moves to operation 420. In an alternative embodiment where the client network application 115 supports local storage, the loader also checks whether the package is in the local storage and if so reads it from the local storage.

At operation 420, the loader causes a request to be sent to the proxy server 120 for the standard client-side script package for the page. Details regarding processing the package request will be described in greater detail with respect to FIG. 5. Flow moves from operation 420 to operation 425 where the client network application determines whether the proxy server 120 returned an error instead of returning anything (otherwise the server returned the requested package). If the server returned an error, then flow moves to operation 445, otherwise flow moves to operation 435.

At operation 435, the loader loads a manifest of objects from the client-side script package. Flow then moves to operation 445. At operation 445, the loader determines whether the page is finished rendering. After the page is finished rendering, flow moves to operation 450 and the loader reads the deferred script objects on the page (e.g., those scripts that were modified as being deferred by the proxy server 120). Flow then moves to operation 455 where the loader reads a first script object and determines whether that script object is memory and returned in the client-side script package. If it is, then flow moves to operation 465, otherwise flow moves to operation 460 and the loader cause the client network application to request and receive the script object directly from the origin server (e.g., bypassing the proxy server 120), and flow moves to operation 470. At operation 465, the loader reads the script object from the client-side script package and flow moves to operation 470. At operation 470, the loader causes the script object to be inserted into the page and flow moves to operation 475. If there are more deferred script objects on the page, then flow moves to operation 480 and the next deferred script object is read and flow moves back to operation 455. If there are no more deferred script objects on the page, then the operations complete.

Figure 5:
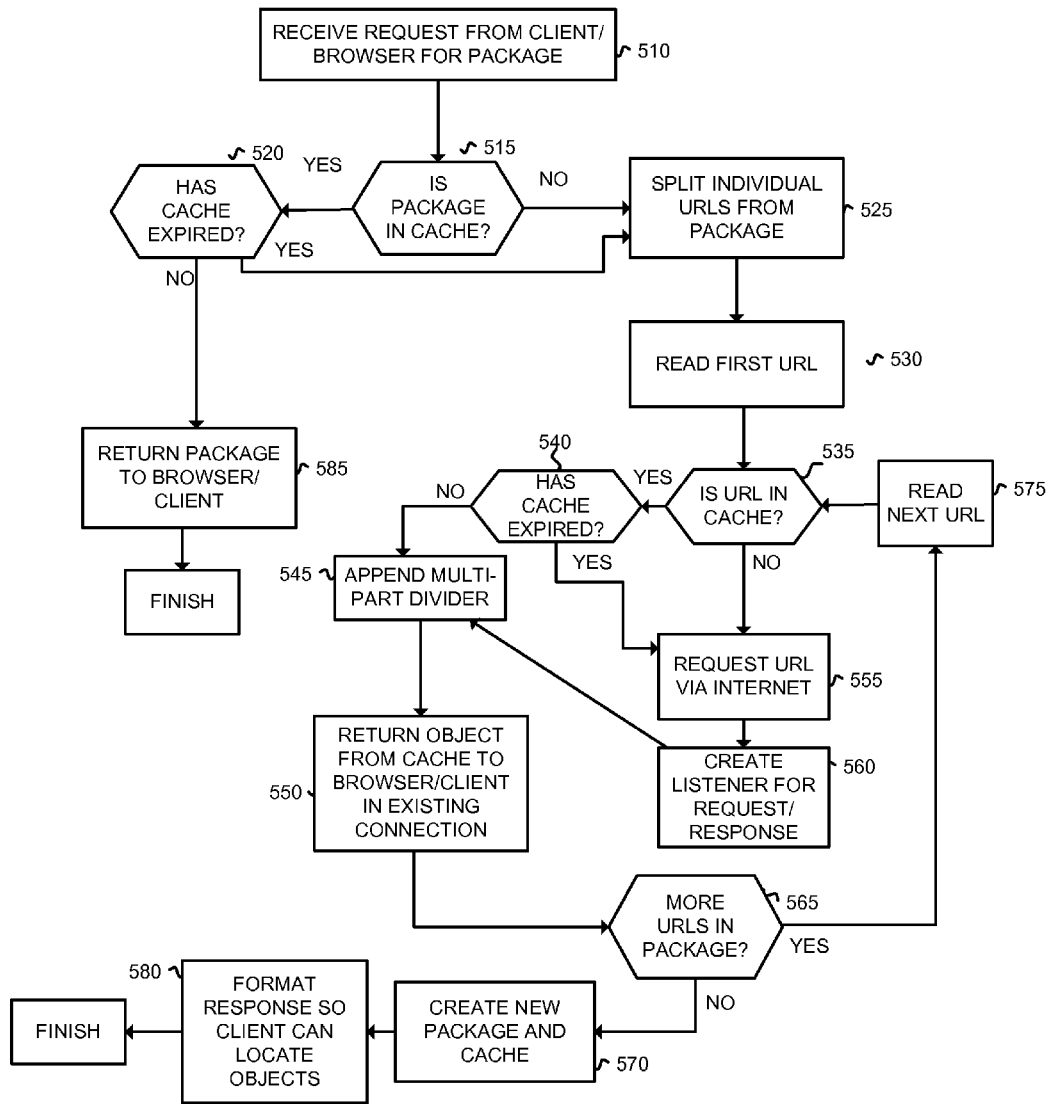
FIG. 5 is a flow diagram illustrating exemplary operations for a proxy server responding to a request from a client network application for a standard client-side script package according to one embodiment.

FIG. 5 is a flow diagram illustrating exemplary operations for a proxy server responding to a request from a client network application for a standard client-side script package according to one embodiment. Although the operations described in FIG. 5 are specific to client-side scripts, similar operations are performed when responding to a package request for other types of objects. At operation 510, the proxy server 120 receives a request from a client network application 115 for a client-side script package for a particular page (or site). Flow then moves to operation 515 where the proxy server 120 determines whether the package is in its cache 122. If it is, then flow moves to operation 520 and if the cached package has not expired, then flow moves to operation 585 and the package is returned to the client network application 115. If the package is not in the cache or has expired, then flow moves to operation 525 and the proxy server 120 splits the individual URLs from the package and flow moves to operation 530.

At operation 530, the proxy server 120 reads the first URL from the package (or otherwise reads one of the URLs from the package) and flow moves to operation 535. If the resource corresponding to the URL is in the cache 122, then flow moves to operation 540 where the proxy server determines whether the cached resource has expired. If the cached resource has expired, then flow moves to operation 555, otherwise flow moves to operation 545. If the resource corresponding to the URL is not in cache (or the cache is expired), flow moves to operation 555 and the proxy server 120 requests the resource corresponding to the URL via the Internet (e.g., the request is sent to the origin server of the resource). Flow moves from operation 555 to operation 560.

At operation 545, the proxy server 120 appends a multipart divider to the page to separate the objects and flow moves to operation 550 where the object is returned to the client network application 115 using the existing connection. Flow then moves to operation 565. It should be understood that the object is returned to the client network application 115 using the existing connection. It should be understood that there may be multiple objects of the package returned using the existing connection, and the objects may be returned as the proxy server 120 locates them.

At operation 560, the proxy server 120 listens for a response from the origin server corresponding to the request in operation 555 and typically receives a response from that origin server, however it should be understood that the origin server may be down or the request may timeout. The response from the origin server may include the requested resource or may be an error message (e.g., 404 error, server error, etc.). Flow moves from operation 560 to operation 545.

At operation 565, the proxy server 120 determines whether there are more URLs in the client-side script package. If there is, then flow moves to operation 575 where the next URL is read and flow then moves back to operation 535. If there are no more URLs that are part of the package, then flow moves to operation 570 and the proxy server 120 creates the client-side script package and caches it in the cache 122. The client-side script package is in a format such that the client network application 115 can locate each different object in the file and potentially store that object in local storage (if local storage is supported by the client network application) at operation 580. In one embodiment, the proxy server 120 forms a response that has an overall header and a multipart divider defined in the header that separates different objects in the response. In another embodiment, the proxy server 120 forms a response that includes a footer index that specifies each object in the response and the number of bytes that offset that object from other objects in the response. The response may either be returned all at once (for example, if it already existed as a whole in the cache) or may be returned as parts are received (in other words, parts of the response may be returned as a stream and, potentially, asynchronously as various objects are fetched URL requests).

Figure 6:
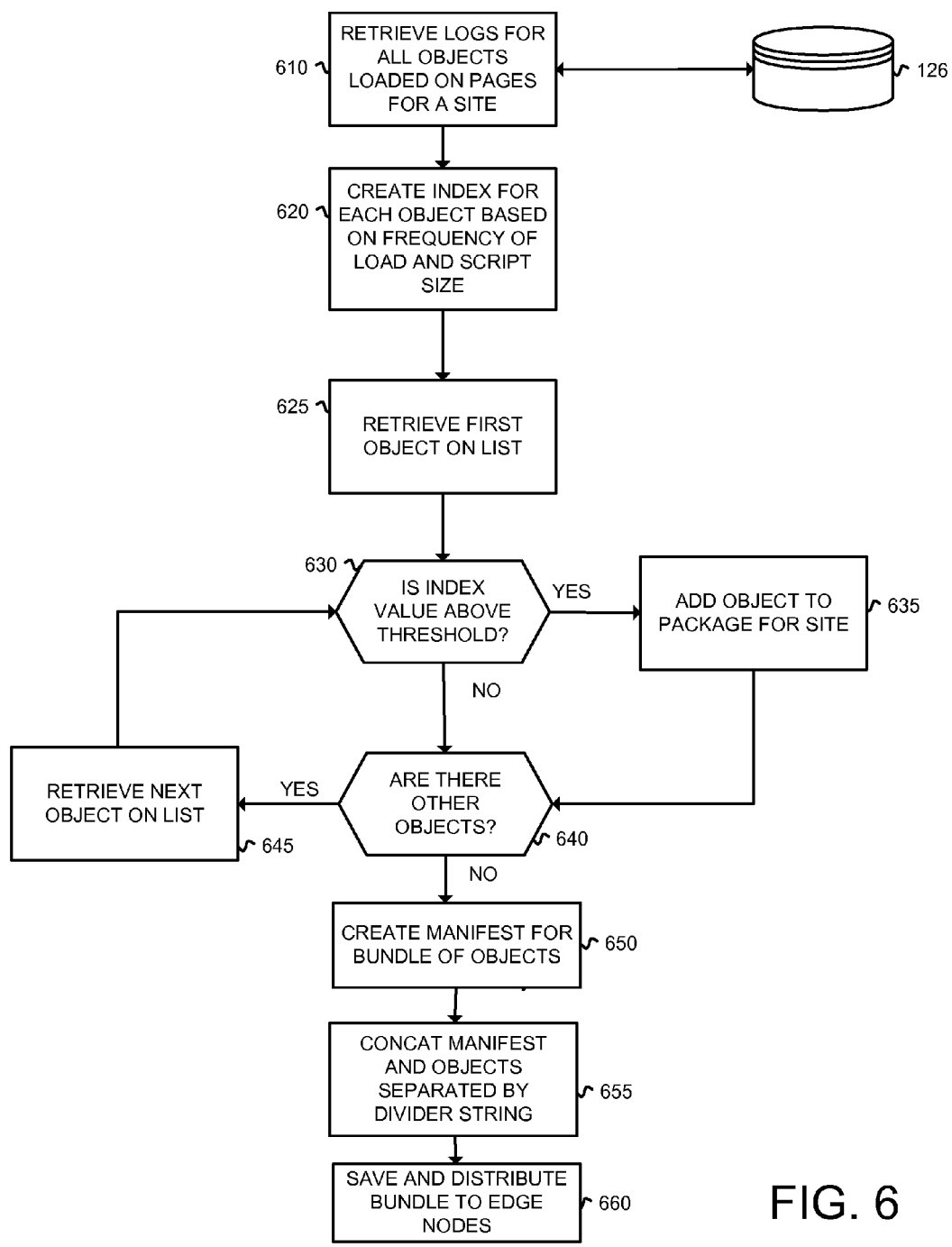
FIG. 6 is a flow diagram illustrating exemplary operations for determining which objects are to be included in a standard object package according to one embodiment.

FIG. 6 is a flow diagram illustrating exemplary operations for determining which objects are to be included in a standard object package according to one embodiment. At operation 610, the proxy server 120 retrieves the logs for all scripts loaded on pages of a particular site from the log storage 126. In one embodiment, the information in the logs may be generated as a result of the loader including a call that sends a manifest of all the objects on the page (Javascript, CSS, Images, styles, classes, Flash elements, sound files, or other objects) and their respective attributes (e.g., size, type, presence in cache, etc.) to the proxy server 120 to be logged.

Figure 7:
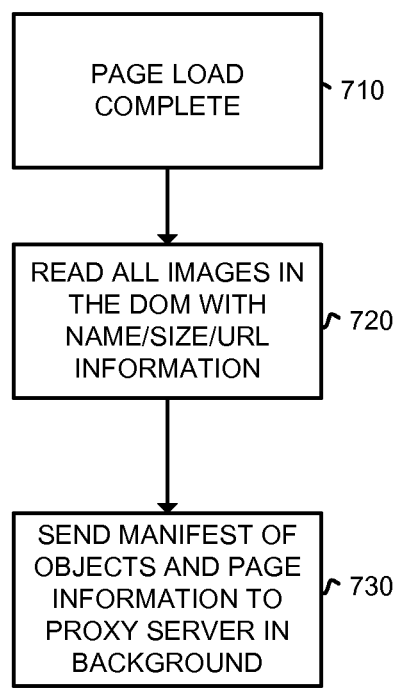
FIG. 7 is a flow diagram illustrating exemplary operations for sending a manifest of objects and their respective attributes to the proxy server according to one embodiment.

For example, FIG. 7 is a flow diagram illustrating exemplary operations for sending a manifest of objects and their respective attributes to the proxy server according to one embodiment. At operation 710, the client network application 115 finishes loading a web page. Flow then moves to operation 720 and the loader reads all the images, CSS classes, flash files, sound files, scripts, and other objects in the DOM (Document Object Model) and their respective attributes (e.g., size, type, name, presence in cache, URL, etc.). Flow then moves to operation 730 and the loader causes the client network application 115 to send a manifest of the objects and page information to the proxy server 120.

With reference back to FIG. 6, flow moves from operation 610 to 620. At operation 620, the proxy server 120 creates an index for each object based on the frequency of load and/or its size. Flow then moves to operation 625 and the proxy server 120 retrieves the first object included in the logs. Flow then moves to operation 630 and the proxy server determines whether the index value is above a predetermined threshold. If it is above a predetermined threshold, then flow moves to operation 635 where the object is added to the standard object package for the site. If it is below the threshold, then flow moves to operation 640 where the proxy server 120 determines whether there are more objects included in the logs. If there is, then flow moves to operation 645 where the next object is retrieved and flow moves back to operation 630. If there are no more objects, then flow moves to operation 650 and the proxy server 120 creates a manifest for the bundle of objects (the standard object package). Flow then moves to operation 655 and the proxy server 120 creates a manifest of objects separated by a divider string. Flow then moves to operation 660 and the standard object package is saved. The standard object package may also be distributed to multiple proxy servers running in one or more data centers.

Figure 8A:
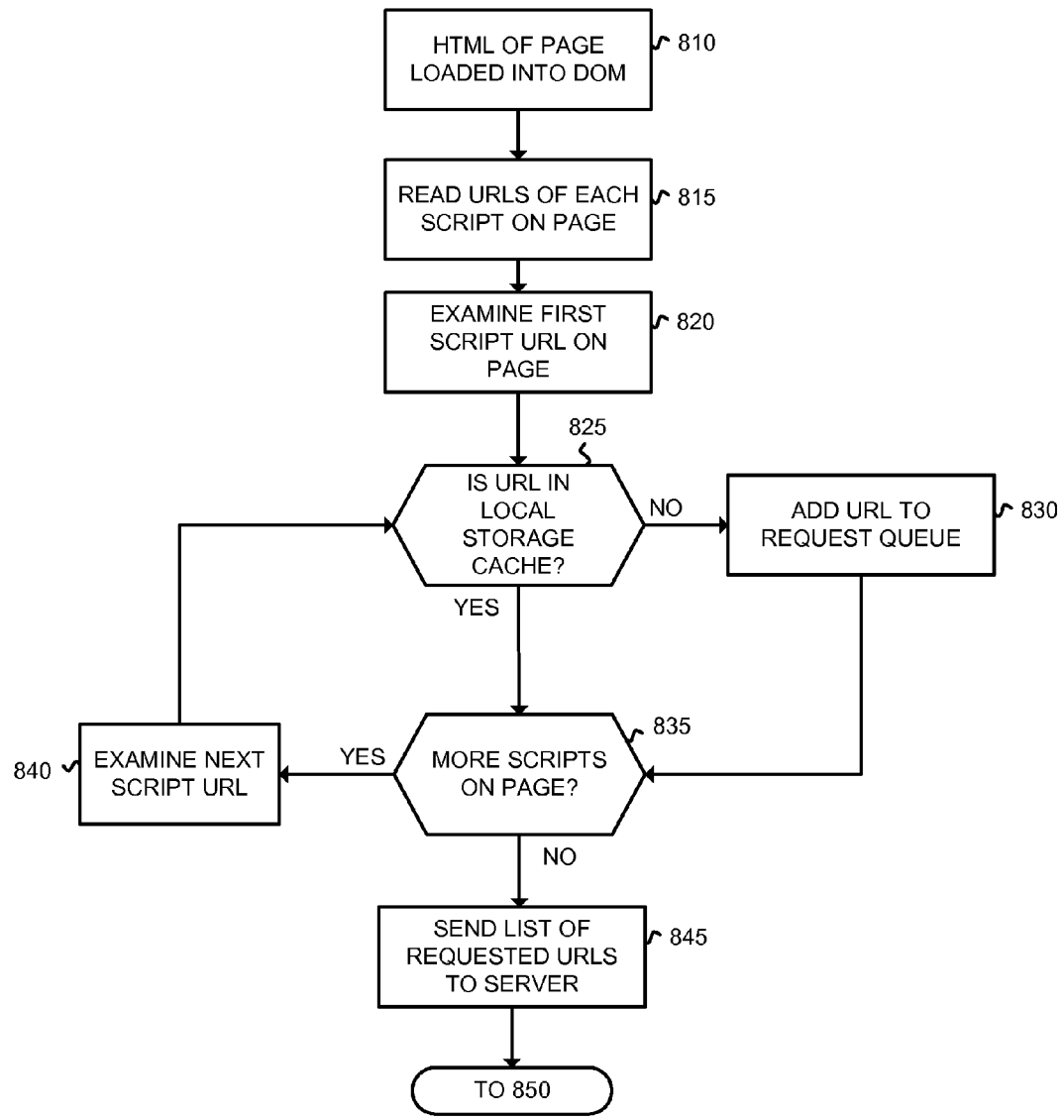
FIG. 8A is a flow diagram illustrating exemplary operations for requesting object(s) that have been deferred according to one embodiment.

In addition to or in lieu of requesting the standard object package, in one embodiment the loader determines each object that has been deferred from loading and makes a request to the proxy server for those objects (typically using a single request). FIG. 8A is a flow diagram illustrating exemplary operations for requesting object(s) that have been deferred according to one embodiment. In one embodiment, the operations performed in FIGS. 8A are performed by a client network application that supports local storage. Although the operations described in FIG. 8A-B are described with reference to client-side scripts, similar operations are performed when requesting different object types (e.g., CSS, images, styles, classes, Flash elements, sound files, or other objects).

At operation 810, the client network application 115 loads the HTML of the webpage into its DOM. Flow then moves to operation 815 and the loader reads the "src" of each URLs of each script on the page and flow moves to operation 820. At operation 820, the loader examines the first script URL on the page (or alternatively one of the script URLs on the page). Flow then moves to operation 825 and the loader determines whether the URL for that script is in local storage. If it is, then flow moves to operation 835, otherwise flow moves to operation 830 and the loader adds the URL to the request queue and flow moves to operation 835.

Figure 9:
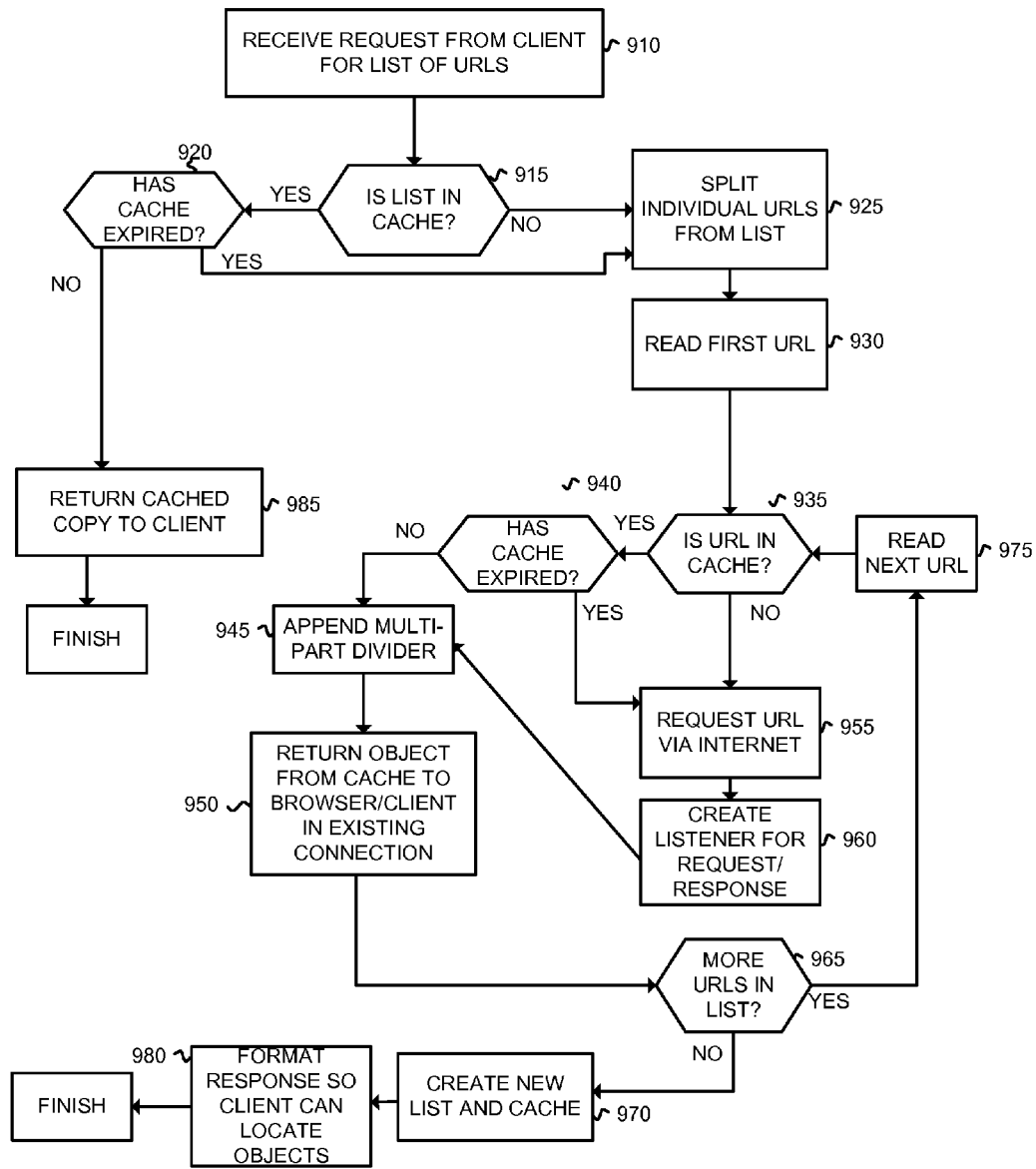
FIG. 9 is a flow diagram illustrating exemplary operations performed on the proxy server 120 when processing a request from a client network application for a dynamic object package according to one embodiment.

At operation 835, the loader determines whether there is another script on the page. If there is, then flow moves to operation 840 and the loader examines the next script URL (or alternatively a different one of the script URLs on the page) and flow moves back to operation 825. If there are no more scripts on the page, then flow moves to operation 845 and loader transmits the list of requested objects (identified through their respective URLs) to the proxy server 120 (assuming that there is at least one URL that is part of the request queue). In one embodiment, the list of requested URLs are transmitted in a single request to the proxy server 120 over a single TCP connection (referred to as a dynamic object package request). Thus, multiple client-side script queries can be grouped into a single TCP request thereby reducing the number of TCP connections required to request the client-side script objects and reducing the time required to request (and therefore receive) the client-side script objects. FIG. 9, which will be described in greater detail later herein, describes operations performed on the proxy server 120 for processing a dynamic object package request from a client network application that includes a list of URLs.

Figure 8B:
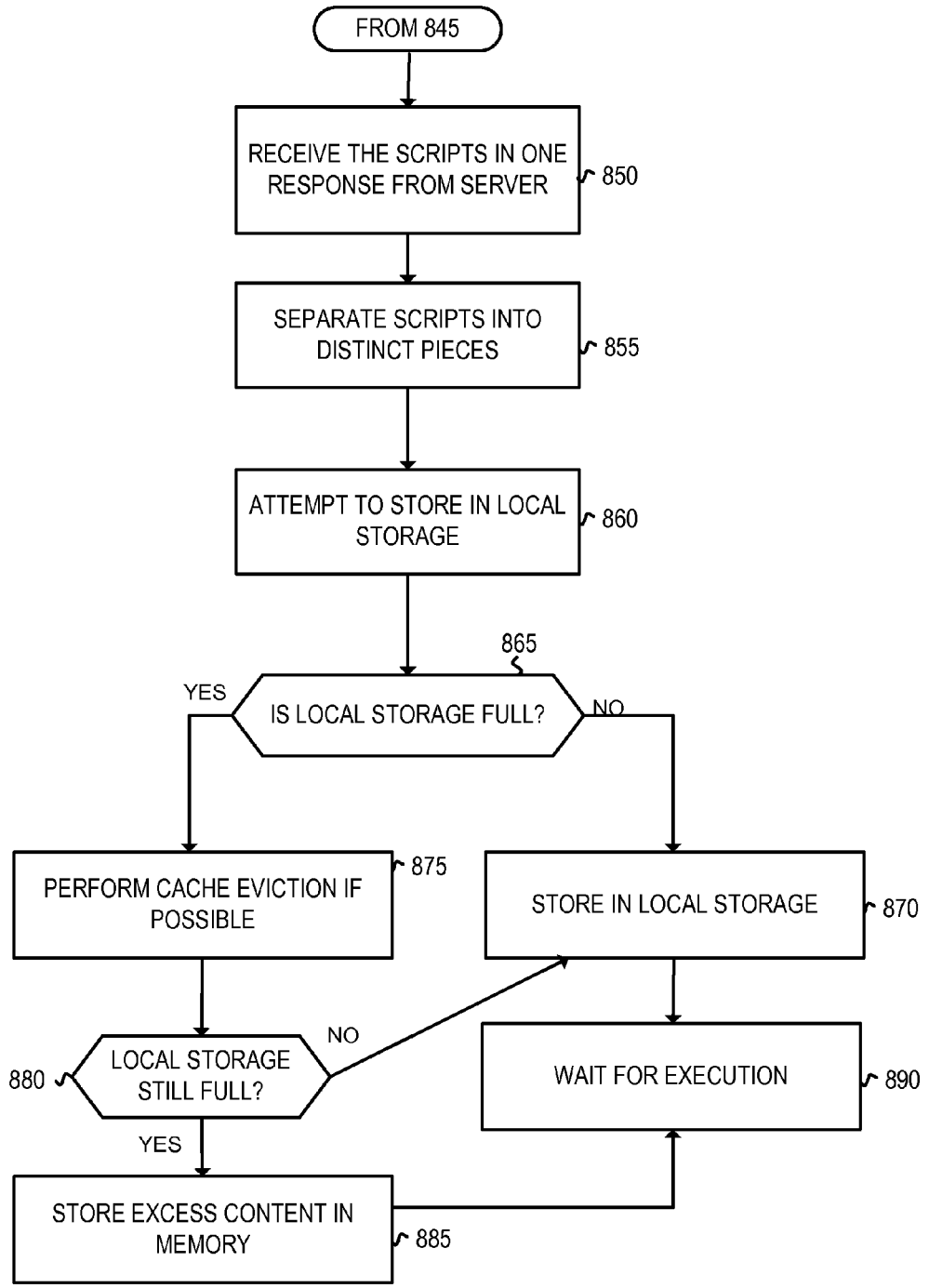
FIG. 8B is a flow diagram illustrating exemplary operations performed responsive to receiving a dynamic object package reply according to one embodiment.

FIG. 8B is a flow diagram illustrating exemplary operations performed responsive to receiving a dynamic object package reply according to one embodiment. The operations begin at operation 850 (from the operation 845) where the client network application 115 receives the scripts in one response from the proxy server 120 over the existing TCP connection. The script objects may be streamed back through the connection as they are located by the proxy server 120 and may not necessarily be in the order in which they were listed in the list of requested URLs in the dynamic object package request. As will be described in greater detail with respect to FIG. 9, the response includes a single file that separates each object in the file such that the client network application can locate each different object and potentially store that object in local storage (if supported). The file in the response includes an object for each of the requested client-side script objects; however some of the object(s) may be error objects. An error object indicates that the proxy server 120 was unable to retrieve the requested object (e.g., due to a 404 error, server error, or other error). Sending a specific error object to the client network application allows it to begin the process of skipping the object, displaying an error message, or establishing a connection in an attempt to request the object directly from the corresponding origin server (bypassing the proxy server).

Flow then moves to operation 855 where the loader separates the scripts into distinct pieces using the information in the file. For example, the header of the response may indicate the positions of the script objects in the file. Next, flow moves to operation 860 and the loader attempts to store the separated script objects in local storage. The use of local storage allows the loader to cache parts of the response (e.g., each individual script object returned in the response); whereas client network application cache is only able to cache the response as a whole. Flow then moves to operation 865 and if the local storage is full (or otherwise cannot support storing the list of scripts), then flow moves to operation 875, otherwise flow moves to operation 870 where the separated script objects are stored in local storage. Flow moves from operation 870 to operation 890 where the client network application 115 waits for execution of the scripts, which will be described in greater detail with reference to FIG. 10.

At operation 875 (local storage is full), the client network application 115 performs cache eviction (if possible) in an attempt to free space in the local storage. For example, the objects whose TTL has expired are removed. As another example, the objects that have a relatively shorter TTL value until expiration are removed. The cache eviction can also be based on the time in the local storage, the size of the objects in local storage, when the object was requested or used on the page, etc. Flow moves to operation 880 where if the local storage is still full (or cannot support storing the list of scripts), flow moves to operation 885 and the list of scripts (or at least the portion of scripts that cannot be stored in the local storage) is held in memory until it is executed. Flow moves from operation 885 to operation 890. If the local storage is not full, then flow moves to operation 870.

FIG. 9 is a flow diagram illustrating exemplary operations performed on the proxy server 120 when processing a request from a client network application for a dynamic object package according to one embodiment. Although the operations described in FIG. 9 are specific to client-side scripts, similar operations are performed when responding to a request for other types of objects.

At operation 910, the proxy server 120 receives a dynamic object package request from a client network application 115 that include a list of objects identified through their respective URLs. The list may be for resources located on different domains (including those which do not point to the proxy server 120). Flow then moves to operation 915 where the proxy server 120 determines whether the resource(s) corresponding to the list of URL(s) is in the cache 122. If they are, then flow moves to operation 920 and if the cache has not expired, then flow moves to operation 985 and the cached copy of those resource(s) are returned to the client network application 115. If the resource(s) corresponding to the list are not in the cache or the cache has expired, flow moves to operation 925 and the proxy server 120 splits the individual URLs from the list and flow moves to operation 930.

At operation 930, the proxy server 120 reads the first URL from the list (or otherwise reads one of the URLs of the list) and flow moves to operation 935. If the resource corresponding to the URL is in the cache 122, then flow moves to operation 940 where the proxy server determines whether the cached resource has expired. If the cached resource has expired, then flow moves to operation 955, otherwise flow moves to operation 545. If the resource corresponding to the URL is not in cache (or the cache is expired), flow moves to operation 955 and the proxy server 120 requests the resource corresponding to the URL via the Internet (e.g., the request is sent to the origin server of the resource). Flow moves from operation 955 to operation 960.

At operation 945, the proxy server 120 appends a multipart divider to the page to separate the objects and flow moves to operation 950 where the object is returned to the client network application 115. Flow then moves to operation 965. It should be understood that the object is returned to the client network application 115 using the existing connection. At operation 960, the proxy server 120 listens for a response from the origin server corresponding to the request in operation 955 and typically receives a response from that origin server, however it should be understood that the origin server may be down or the request may timeout. The response from the origin server may include the requested resource or may be an error message (e.g., 404 error, server error, etc.). Flow moves from operation 960 to operation 945.

At operation 965, the proxy server 120 determines whether there are more URLs in the list of URLs. If there is, then flow moves to operation 975 where a next URL is read and flow then moves back to operation 935. If there are no more URLs that are part of the list, then flow moves to operation 970 and the proxy server 120 creates the list of resources and caches it in the cache 122. The proxy server 120 formats the response such that the client network application 115 can locate each different object in the file and potentially store that object in local storage (if local storage is supported by the client network application) at operation 980. FIG. 12 illustrates an exemplary response according to one embodiment. In one embodiment, the proxy server 120 forms a response that has an overall header and a multipart divider defined in the header that separates different objects in the response. In another embodiment, the proxy server 120 forms a response that includes a footer index that specifies each object in the response and the number of bytes that offset that object from other objects in the response. The response may either be returned all at once (for example, if it already existed as a whole in the cache) or may be returned as parts are received (in other words, parts of the response may be returned as a stream and, potentially, asynchronously as various objects are fetched URL requests).

Figure 10:
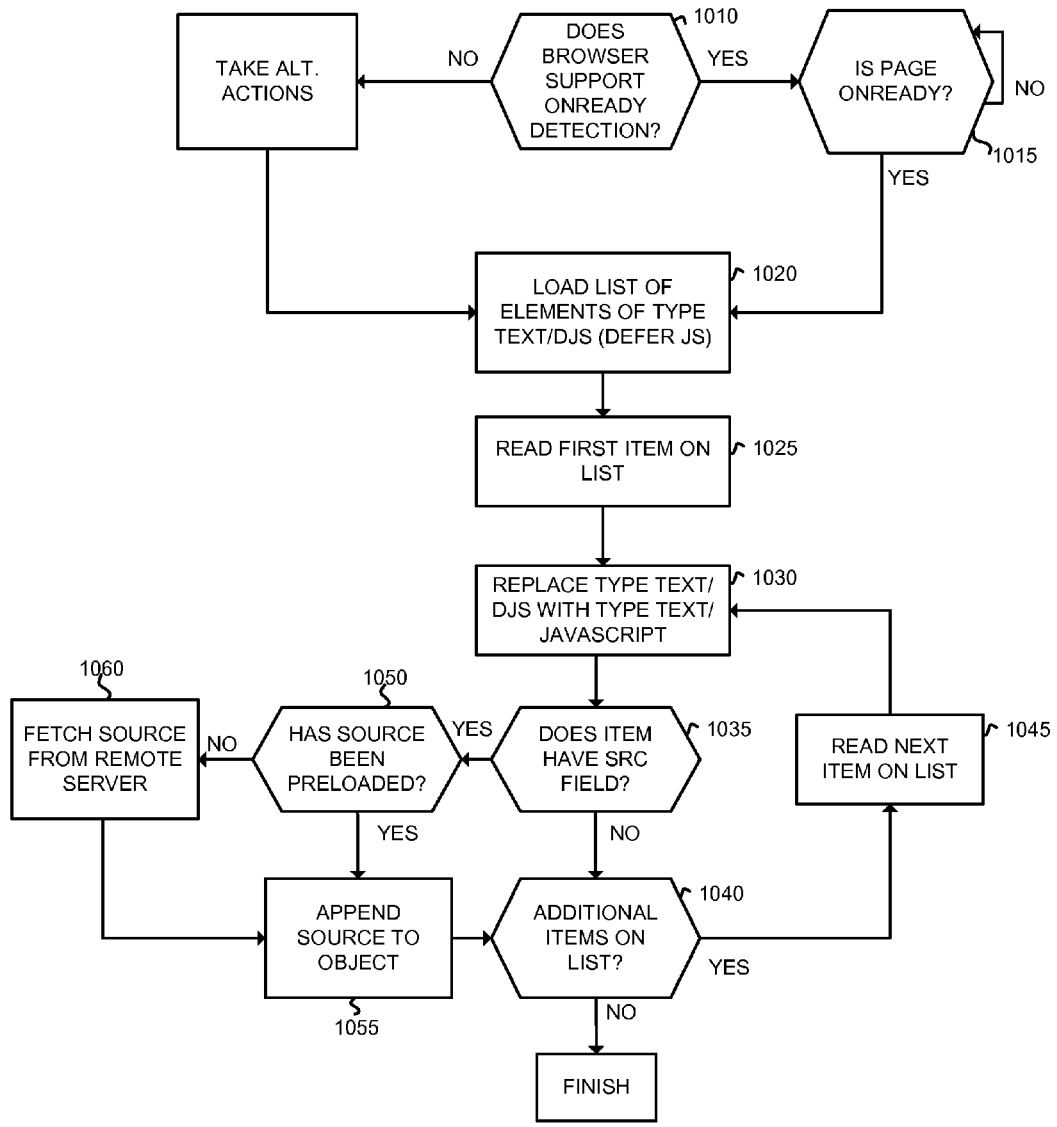
FIG. 10 is a flow diagram illustrating exemplary operations performed by a client network application for loading scripts after the page has loaded according to one embodiment.

FIG. 10 is a flow diagram illustrating exemplary operations performed by a client network application for loading scripts after the page has loaded according to one embodiment. At operation 1010, if the client network application supports the onready element, then flow moves to operation 1015, otherwise flow moves to operation 1070 where alternative actions are taken. For example, the loader causes the client network application 115 to begin a timer that delays execution of the rest of the page for a pre-defined amount of time. As another example, the loader checks the onReadyStateChange element and the window.onload element to determine if the page is finished loading.

At operation 1015, the loader waits until the page has finished loading the HTML (is in the onready state). After the page has finished loading, then flow moves to operation 1020 and the loader scans the HTML document and loads the list of elements that have been changed to a non-standard form to indicate that loading has been deferred (e.g., text/djs). Flow the moves to operation 1025 and the client network application reads the first item on the list and replaces the non-standard form type with the standard form type (e.g., replace text/djs with text/javascript) at operation 1030. Flow moves from operation 1030 to operation 1035.

At operation 1035, the client network application 115 determines whether the element has a source field. If it does, then flow moves to operation 1050 where it is determined whether the source has been preloaded (e.g., is in local memory and ready for execution). If the source has not been preloaded, then flow moves to operation 1060 and the object is attempted to be read from its origin server (which may or may not involve the proxy server 120) and flow moves to operation 1055. If the source is preloaded, flow moves to operation 1055. At operation 1055, the client network application 115 appends the source to the object and flow moves to operation 1040. In one embodiment, the client network application 115 performs an "eval" command that executes the script object and outputs it in its original location in the page.

At operation 1040, the client network application 115 determines whether there are additional items on the list of elements. If there is, then flow moves to operation 1045 and a next item is read from the list and flow moves back to operation 1030, otherwise the operations complete.

Figure 11:
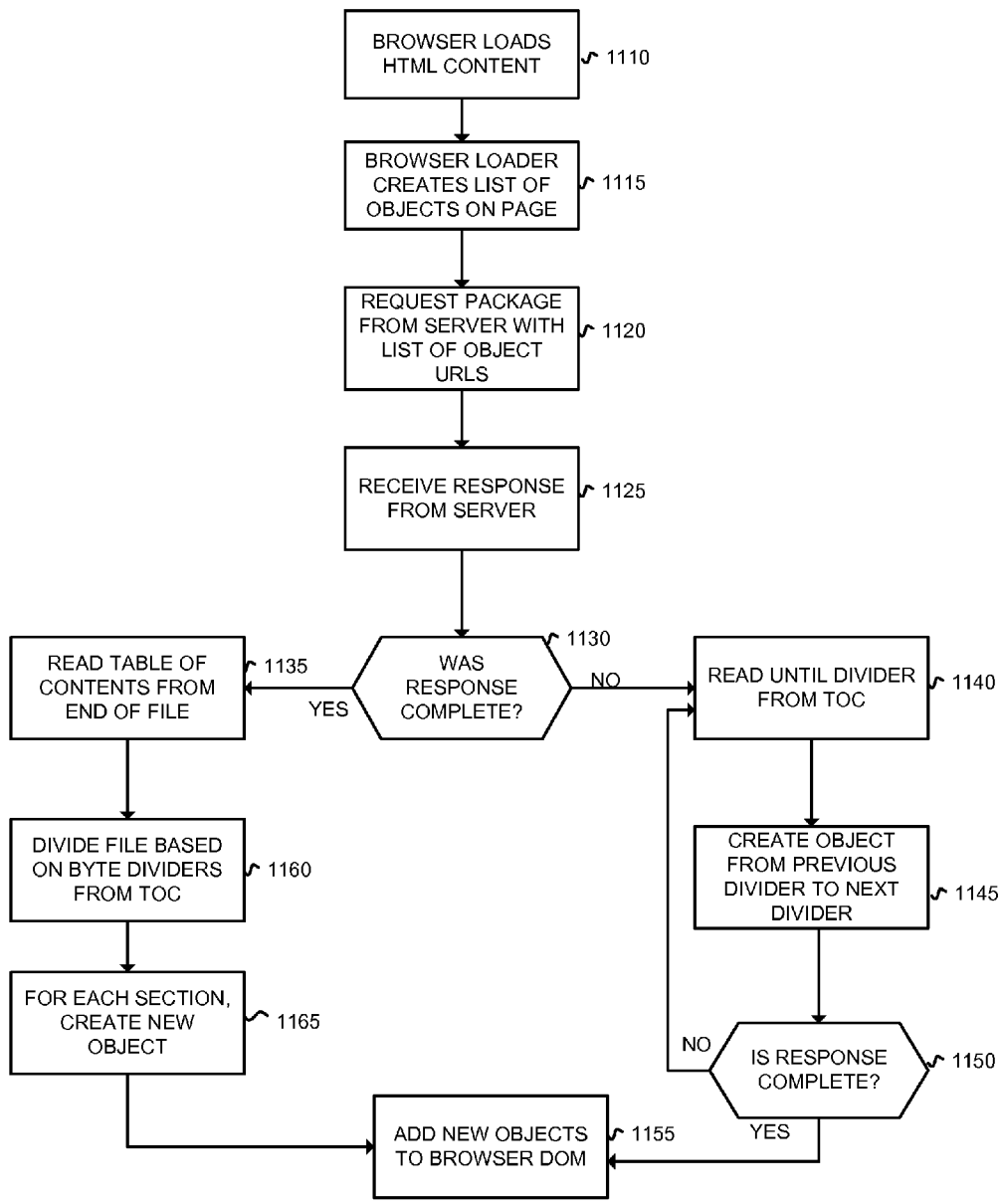
FIG. 11 illustrates exemplary operations performed by a client network application processing responses from the proxy server including multiple resources corresponding to multiple URLs according to one embodiment.

FIG. 11 illustrates exemplary operations performed by a client network application processing responses from the proxy server including multiple resources corresponding to multiple URLs according to one embodiment. At operation 1110, the client network application 115 loads HTML content. Next, the loader creates a list of objects on the page at operation 1115 and requests the objects corresponding to the object URLs. In one embodiment, a single request includes all of the list of object URLs, while in other embodiments there are multiple requests transmitted to the proxy server for the list of objects. Flow then moves to operation 1125.

At operation 1125, the client network application receives the response from the proxy server 120. Flow then moves to operation 1130 where it is determined whether the response is complete. If it is not complete, flow moves to operation 1140. If the response is complete, then flow moves to operation 1135. As previously described, the response from the proxy server 120 may include multiple objects that are separated in a way that the client network application can retrieve each individual object from the response. The following operations use as an example a response including a table of contents and a multi-part divider to separate the objects. However, it should be understood that the type of separating the file into individual objects is exemplary and may be different in different embodiments. At operation 1135, the client network application 115 reads the table of contents from the end of the file and flow moves to operation 1160. At operation 1160, the file is divided based on byte dividers as indicated in the table of contents. Flow then moves to operation 1165 and for each new section, the client network application 115 creates a new object. Flow then moves to operation 1155.

At operation 1140, the client network application 115 reads the file until it reaches a divider as indicated in the table of contents. Flow then moves to operation 1145 and the client network application 115 creates an object from the previous divider to the next divider. Thus, the dividers separate the objects in the response. Flow then moves to operation 1150 and if the client network application 115 has finished reading the objects in the response, then flow moves to operation 1155. At operation 1155, the client network application 115 adds the new objects to its DOM The objects will then execute. Alternatively, the client network application 115 performs an "eval" on the objects, or otherwise prepares the objects for execution.

FIG. 12 illustrates an exemplary package response according to one embodiment. The package response includes a header 1220 that defines a multipart divider that separates the different objects 1270 in the response. The divider is created randomly by the proxy server when creating the package file. The response includes a package manifest 1250 (table of contents) that includes a header that indicates the total number of bytes for the object 1225, the total number of bytes in the object without the header 1230, an identifier 1235 that indicates the object is the manifest (table of contents), the response code for the object 1240, and the type of object 1245. The package manifest object 1250 also includes a list of objects to follow in the package 1252. It should be noted that each object in the list 1252 has been assigned a unique object identifier (0-4 in this case). The objects 1270 below each include a header and are separated by the multipart divider 1220. The header of each indicates the identifier of the object. For example, the header of the object 1254 includes an identifier 1255 of 0 that indicates it is an object for http://www.example.com/small1.js. Each object header also includes a TTL value. For example, the header of the object 1254 includes the TTL value 1260 (7200). Each object header also includes a server response code. For example, the header of the object 1264 includes a status code 1265 that indicates that the object could not be found.

In one embodiment, the objects 1270 are streamed back to the requesting client network application as they are retrieved. It should also be noted that the order of the objects 1270 is not necessarily the same as the order requested (assumed to be in order in the list 1252). For example, the object with an identifier of 4 is streamed to the client network application before the object with an identifier of 1.

While embodiments have been described with respect to a proxy provisioned through DNS that can change HTML (e.g., include the loader as previously described herein), embodiments are not so limited. In particular, in some embodiments, the HTML is cached and modified offline rather than being dynamically altered by a proxy server.

Figure 13:
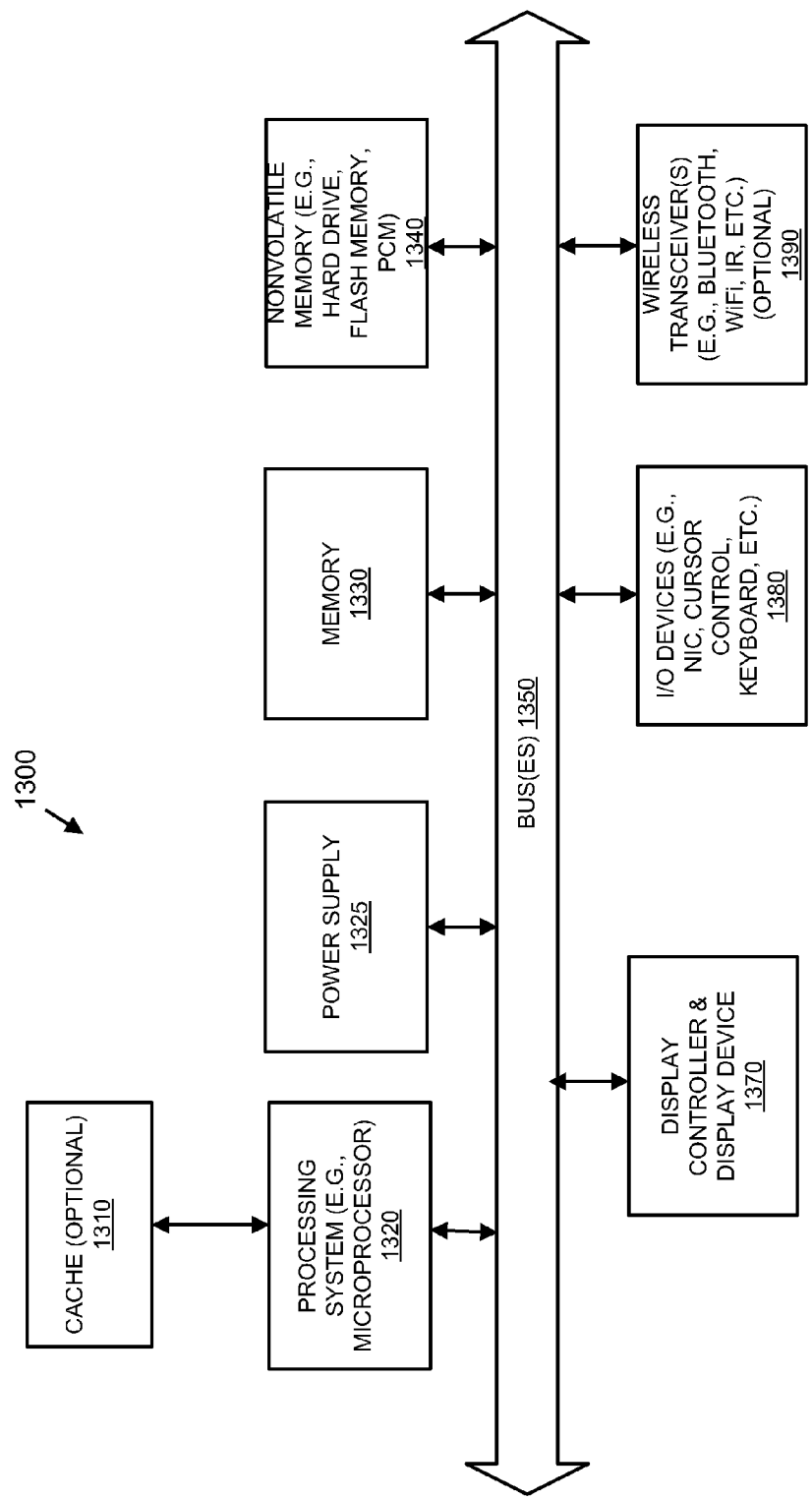
FIG. 13 illustrates an exemplary computer system used in accordance with some embodiments.

As illustrated in FIG. 13, the computer system 1300, which is a form of a data processing system, includes the bus(es) 1350 which is coupled with the processing system 1320, power supply 1325, memory 1330, and the nonvolatile memory 1340 (e.g., a hard drive, flash memory, Phase-Change Memory (PCM), etc.). The bus(es) 1350 may be connected to each other through various bridges, controllers, and/or adapters as is well known in the art. The processing system 1320 may retrieve instruction(s) from the memory 1330 and/or the nonvolatile memory 1340, and execute the instructions to perform operations described herein. The bus 1350 interconnects the above components together and also interconnects those components to the display controller & display device 1370, Input/Output devices 1380 (e.g., NIC (Network Interface Card), a cursor control (e.g., mouse, touchscreen, touchpad, etc.), a keyboard, etc.), and the optional wireless transceiver(s) 1390 (e.g., Bluetooth, WiFi, Infrared, etc.). In one embodiment, the client devices 110A-I, the service server 125, the proxy server 120, and/or the origin servers 130A-L can take the form of the computer system 1300.

Embodiments of the invention described herein improve performance of loading web resources. In some embodiments, client-side scripts included in the HTML are deferred from loading until the rest of the HTML content is loaded thereby reducing the perceived loading time since the core of the web page is loaded. Thus, the core content of the HTML page is loaded and then the client-side scripts are loaded. In some embodiments, multiple object queries (e.g., multiple client-side script queries) are collected into a single TCP request to the proxy server thereby reducing the time taken by initiating multiple TCP requests for multiple resources. In addition, the responses for the multiple object queries are streamed to the client network application through the single TCP connection as they are retrieved, potentially asynchronously.

While embodiments have been described with reference to requesting multiple client-side script objects into a single TCP request to the proxy server and the proxy server streaming back the results as it retrieves them through that single TCP connection, it should be understood that embodiments are not limited to client-side script objects. In some embodiments, any object that has a "src" attribute may be packaged into a request (along with or separate from the request for the client-side script objects). In such embodiments, instead of the client network application executing the client-side script object, the client network application typically recreates a DOM object and inserts the object into the correct location on the page. For example, if the object is an image, the client network application creates a DOM object for the image and inserts it into its original location on the page.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a server for improving loading of web resources, the method comprising:
    receiving a first request from a client network application for a Hypertext Markup Language (HTML) document, wherein the first request identifies a first domain that hosts the HTML document;
    retrieving the requested HTML document, wherein the retrieved HTML document includes,
        a first reference to a first object that is located at a second domain, and
        a second reference to a second object that is located at a third domain;
    modifying the HTML document including inserting a client-side script loader or a reference to the client-side script loader into the HTML document, wherein the client-side script loader is configured to, when executed by the client network application, perform the following:
        initiate a single Transmission Control Protocol (TCP) connection with the server, and
        transmit a single second request to the server over the single TCP connection for the first object and the second object; and
    transmitting the modified HTML document to the client network application.

2. The method of claim 1, further comprising:
    receiving the single second request over the single TCP connection from the client network application;
    retrieving the first object and the second object; and
    transmitting the first object and the second object to the client network application in a single first response over the single TCP connection.

3. The method of claim 2, wherein the first object and the second object are included in the single first response and transmitted to the client network application as they are retrieved regardless of an order in which they are retrieved.

4. The method of claim 2, wherein retrieving the first object includes determining that the first object is in cache and has not expired and retrieving the first object from the cache.

5. The method of claim 2, wherein retrieving the second object includes,
   determining that the second object is not in cache or is in cache but expired;
   transmitting a third request to an origin server that hosts the first object; and
   receiving a second response from the origin server that includes the first object.

6. The method of claim 1, wherein prior to transmitting the modified HTML document to the client network application, automatically modifying the first reference and the second reference such that the client network application will not request the first object and the second object respectively until the client network application executes the client-side script loader.

7. The method of claim 6, wherein the client-side script loader is configured to be executed by the client network application only after the client network application has completed loading the rest of the HTML document.

8. The method of claim 1, wherein the first request and the single second request are received at the server as a result of a Domain Name System (DNS) request for the first domain, second domain, and third domain resolving to an IP address of the server.

9. A non-transitory machine-readable storage medium that provides instructions that, when executed by a processor of a server, cause said processor to perform operations comprising:
   receiving a first request from a client network application for a Hypertext Markup Language (HTML) document, wherein the first request identifies a first domain that hosts the HTML document;
   retrieving the requested HTML document, wherein the retrieved HTML document includes,
      a first reference to a first object that is located at a second domain, and
      a second reference to a second object that is located at a third domain;
   modifying the HTML document including inserting a client-side script loader or a reference to the client-side script loader into the HTML document, wherein the client-side script loader is configured to, when executed by the client network application, perform the following:
      initiate a single Transmission Control Protocol (TCP) connection with the server, and
      transmit a single second request to the server over the single TCP connection for the first object and the second object; and
   transmitting the modified HTML document to the client network application.

10. The non-transitory machine-readable storage medium of claim 9, wherein the non-transitory machine-readable storage medium further provides instructions that, when executed by the processor of the server, cause said processor to perform operations comprising:
    receiving the single second request over the single TCP connection from the client network application;
    retrieving the single object and the second object; and
    transmitting the first object and the second object to the client network application in a single first response over the single TCP connection.

11. The non-transitory machine-readable storage medium of claim 10, wherein the first object and the second object are included in the single first response and transmitted to the client network application as they are retrieved regardless of an order in which they are retrieved.

12. The non-transitory machine-readable storage medium of claim 10, wherein retrieving the first object includes determining that the first object is in cache and has not expired and retrieving the first object from the cache.

13. The non-transitory machine-readable storage medium of claim 10, wherein retrieving the second object includes,
    determining that the second object is not in cache or is in cache but expired;
    transmitting a third request to an origin server that hosts the first object; and
    receiving a second response from the origin server that includes the first object.

14. The non-transitory machine-readable storage medium of claim 9, wherein prior to transmitting the modified HTML document to the client network application, automatically modifying the first reference and the second reference such that the client network application will not request the first object and the second object respectively until the client network application executes the client-side script loader.

15. The non-transitory machine-readable storage medium of claim 14, wherein the client-side script loader is configured to be executed by the client network application only after the client network application has completed loading the rest of the HTML document.

16. The non-transitory machine-readable storage medium of claim 9, wherein the first request and the single second request are received at the server as a result of a Domain Name System (DNS) request for the first domain, second domain, and third domain resolving to an IP address of the server.

17. A server for improving loading of a web page, the server comprising
    a processor; and
    a non-transitory machine-readable storage medium configured to store instructions that, when executed by the processor, cause said processor to perform the following:
       receive a first request from a client network application for a Hypertext Markup Language (HTML) document, wherein the first request identifies a first domain that hosts the HTML document;
       retrieve the requested HTML document, wherein the retrieved HTML document includes,
          a first reference to a first object that is located at a second domain, and
          a second reference to a second object that is located at a third domain;
       modify the HTML document including an insertion of a client-side script loader or a reference to the client-side script loader into the HTML document, wherein the client-side script loader is configured to, when executed by the client network application, perform the following:
          initiate a single Transmission Control Protocol (TCP) connection with the server, and
          transmit a single second request to the server over the single TCP connection for the first object and the second object; and transmit the modified HTML document to the client network application.

18. The server of claim 17, wherein the non-transitory machine-readable storage medium further is configured to store instructions that, when executed by the processor of the server, cause said processor to perform the following:
receive the single second request over the single TCP connection from the client network application;
retrieve the first object and the second object; and
transmit the first object and the second object to the client network application in a single first response over the single TCP connection.

19. The server of claim 18, wherein the first object and the second object are included in the single first response and are to be transmitted to the client network application as they are retrieved regardless of an order in which they are retrieved.

20. The server of claim 18, wherein retrieval of the first object includes the following operations to be performed,
determine that the first object is in cache and has not expired, and
retrieve the first object from the cache.

21. The server of claim 18, wherein retrieval of the second object includes the following operations to be performed,
determine that the second object is not in cache or is in cache but expired;
transmit a third request to an origin server that hosts the first object; and
receive a second response from the origin server that includes the first object.

22. The server of claim 17, wherein prior to transmitting the modified HTML document to the client network application, automatically modify the first reference and the second reference such that the client network application will not request the first object and the second object respectively until the client network application executes the client-side script loader.

23. The server of claim 22, wherein the client-side script loader is configured to be executed by the client network application only after the client network application has completed loading the rest of the HTML document.

24. The server of claim 17, wherein the first request and the single second request are received at the server as a result of a Domain Name System (DNS) request for the first domain, second domain, and third domain resolving to an IP address of the server.

* * * * *